United States Patent
Kumazaki et al.

(10) Patent No.: US 9,772,256 B2
(45) Date of Patent: Sep. 26, 2017

(54) TOOL ABNORMALITY DETERMINATION SYSTEM

(75) Inventors: Shinya Kumazaki, Chiryu (JP); Kazuya Furukawa, Chiryu (JP); Atsushi Kamiya, Chiryu (JP)

(73) Assignee: FUJI MACHINE MFG. CO., LTD., Chiryu-shi (JP)

( * ) Notice: Subject to any disclaimer, the term of this patent is extended or adjusted under 35 U.S.C. 154(b) by 526 days.

(21) Appl. No.: 14/373,245

(22) PCT Filed: Sep. 14, 2012

(86) PCT No.: PCT/JP2012/073735
§ 371 (c)(1),
(2), (4) Date: Aug. 1, 2014

(87) PCT Pub. No.: WO2013/108435
PCT Pub. Date: Jul. 25, 2013

(65) Prior Publication Data
US 2014/0365177 A1    Dec. 11, 2014

(30) Foreign Application Priority Data

Jan. 19, 2012 (JP) .................................. 2012-009244

(51) Int. Cl.
G01M 13/00 (2006.01)
B23Q 17/09 (2006.01)
G01M 99/00 (2011.01)

(52) U.S. Cl.
CPC ......... *G01M 13/00* (2013.01); *B23Q 17/0961* (2013.01); *G01M 99/005* (2013.01)

(58) Field of Classification Search
CPC .................................................... G01M 13/00
USPC ......................................................... 702/183
See application file for complete search history.

(56) References Cited

U.S. PATENT DOCUMENTS

| 4,456,960 A | 6/1984 | Wakai | |
|---|---|---|---|
| 6,604,013 B1 * | 8/2003 | Hamidieh | G05B 19/4065 700/174 |
| 2006/0019578 A1 * | 1/2006 | Yamane | B24B 49/16 451/8 |

(Continued)

FOREIGN PATENT DOCUMENTS

| JP | 56 139855 | 10/1981 |
|---|---|---|
| JP | 63 278746 | 11/1988 |

(Continued)

OTHER PUBLICATIONS

International Search Report Issued Oct. 30, 2012 in PCT/JP12/073735 Filed Sep. 14, 2012.

*Primary Examiner* — Ricky Ngon
(74) *Attorney, Agent, or Firm* — Oblon, McClelland, Maier & Neustadt, L.L.P.

(57) ABSTRACT

A tool abnormality determination system is provided. The tool abnormality determination system includes: a tool that machines a workpiece; a control device that includes a storage portion in which a monitoring range is stored and an arithmetic portion for comparing the monitoring range to a load of the tool during machining; and an interface device that can notify, when the load of the tool exceeds the monitoring range, an operator of a question regarding whether or not the tool is in an abnormal condition other than abrasion.

11 Claims, 13 Drawing Sheets

(56) References Cited

U.S. PATENT DOCUMENTS

2008/0082304 A1* 4/2008 Miller .................... G05B 17/02
  703/9
2008/0088827 A1* 4/2008 Luo .................... G01N 21/8422
  356/72

FOREIGN PATENT DOCUMENTS

JP    2 256448    10/1990
JP    7 132440     5/1995

* cited by examiner

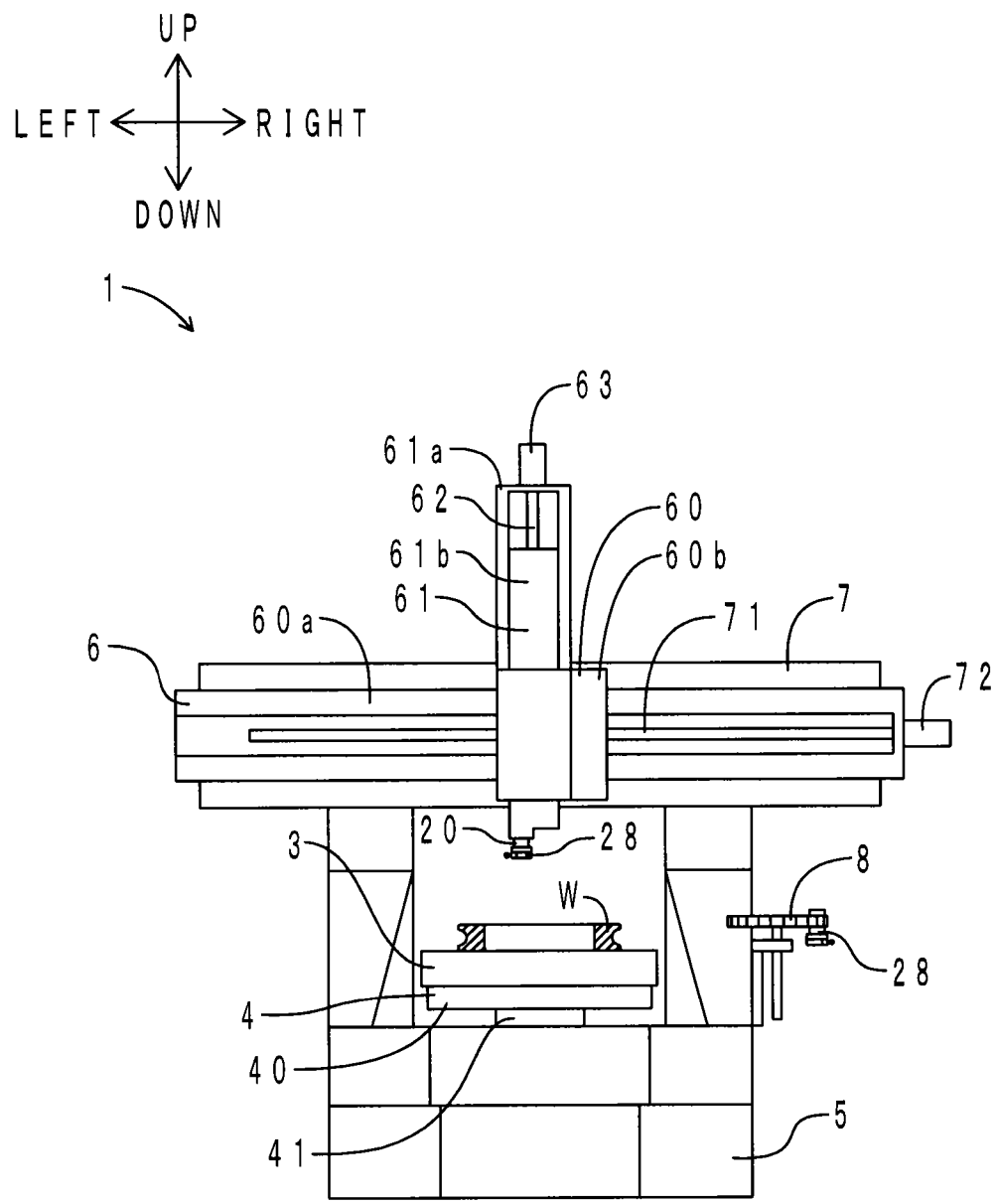
F I G. 1

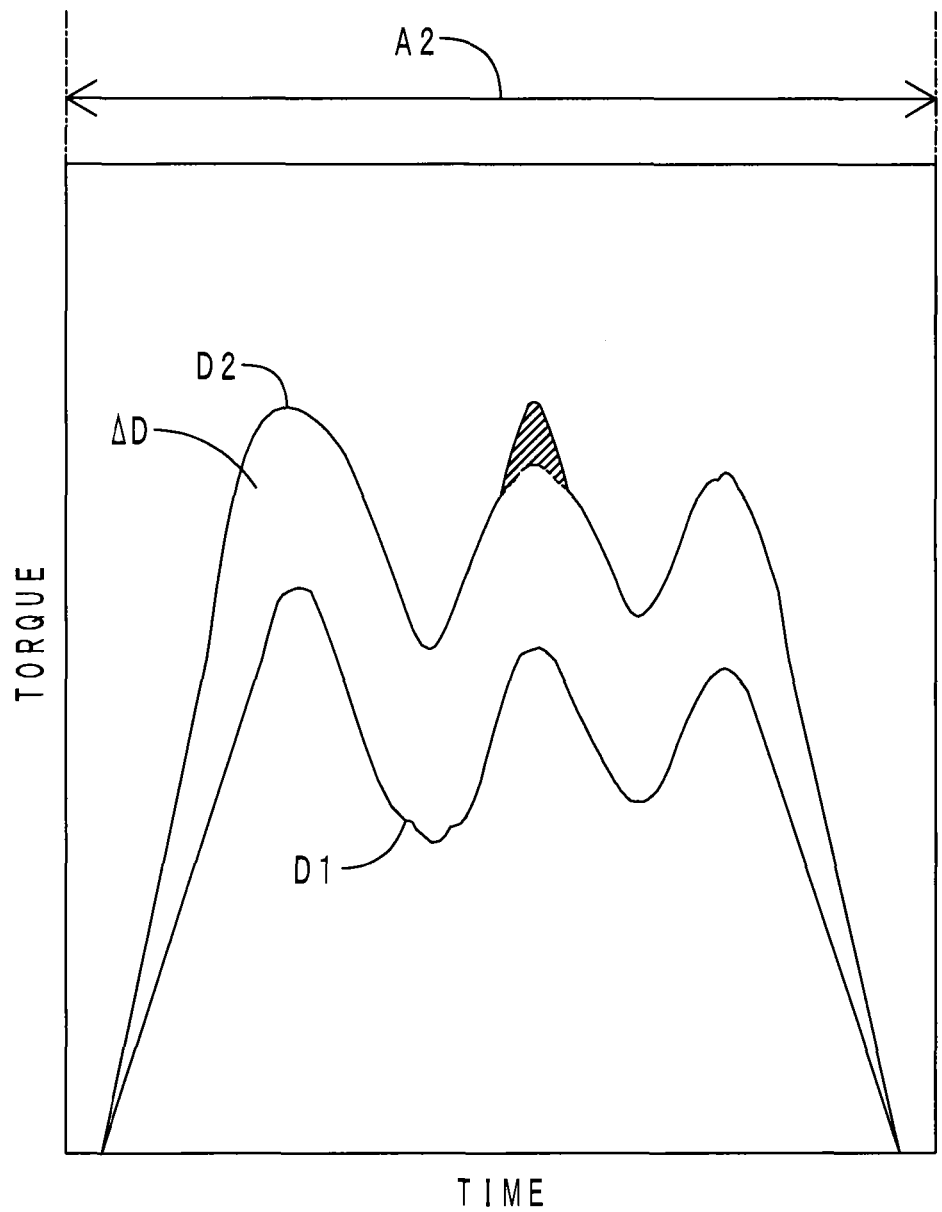
F I G. 8

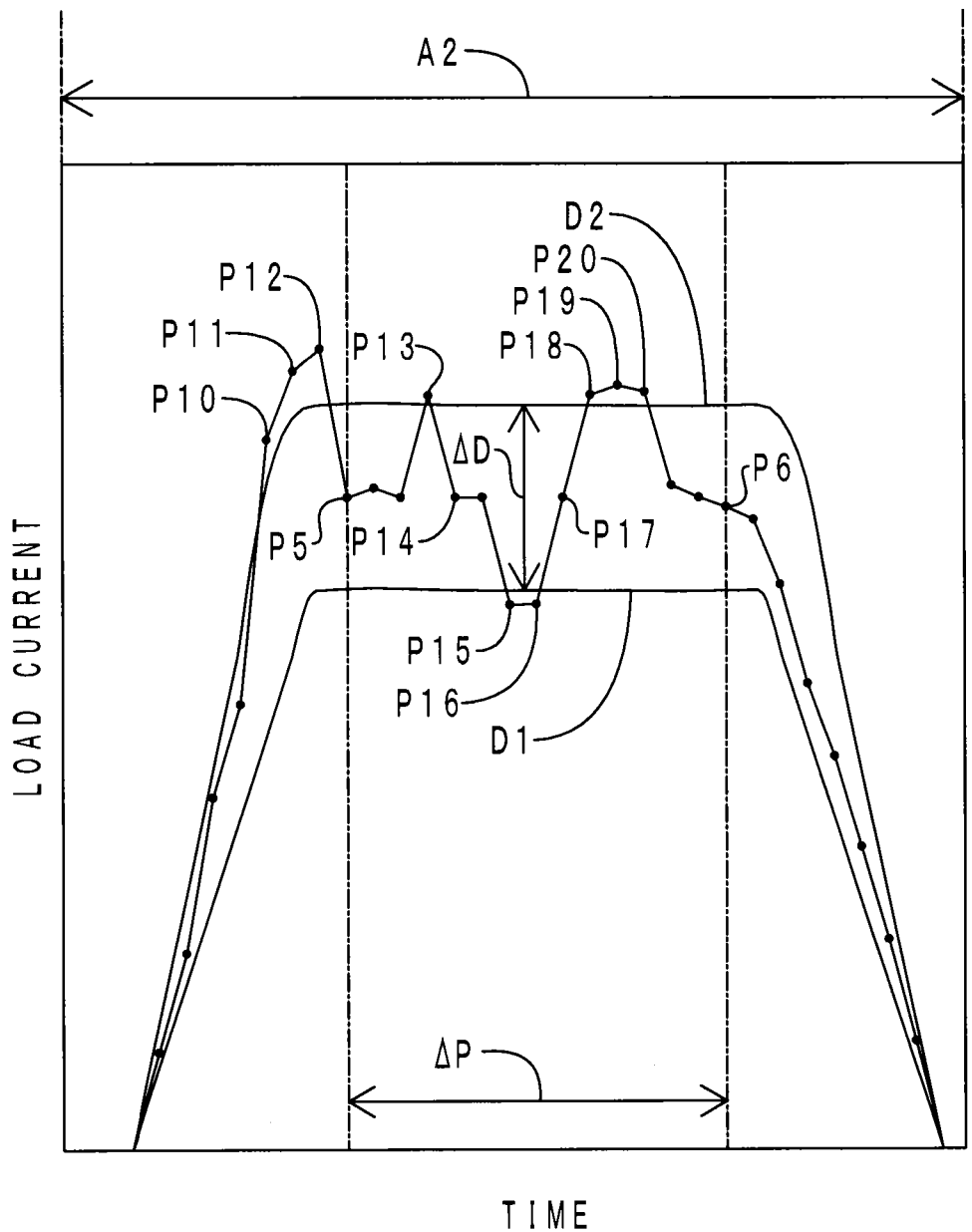
F I G. 11

TOOL ABNORMALITY DETERMINATION SYSTEM

TECHNICAL FIELD

The present disclosure relates to a tool abnormality determination system of detecting a tool abnormality, such as chipping, by monitoring a load during machining, such as turning.

BACKGROUND ART

When a blade of a cutting tool is chipped during the machining of a workpiece in turning, a torque of a motor which moves the cutting tool and a torque of a spindle motor which moves the workpiece are changed. A tool abnormality determination system detects chipping based on the torque changes. That is, the tool abnormality determination system compares an actual torque change to a threshold value for determining abnormality and, when the actual torque exceeds the threshold value, determines that chipping occurs.

However, when the same type of workpiece is machined, a torque value or a torque fluctuation range changes depending on a change in material lot, a machining part, and a traveling direction of a tool. Therefore, when the threshold value is fixed, the possibility of erroneous determination is increased.

PTL 1 discloses a method of monitoring a machining load, the method including: obtaining sampling data of a torque of a motor through multiple trial cutting operations; obtaining reference data and variance from the sampling data; and setting a threshold value according to variations in the sampling data. According to the method of monitoring a machining load disclosed in PTL 1, a threshold value for a machining part having a large torque variation can be set to be large. Conversely, a threshold value for a machining part having a small torque variation can be set to be small.

CITATION LIST

Patent Literature

PTL 1: JP-A-7-132440

SUMMARY OF INVENTION

Technical Problem

However, in the case of the method of monitoring a machining load disclosed in PTL 1, once a monitoring range is set, there is no opportunity to change the set monitoring range after the machining of a workpiece is started. Therefore, the precision of the monitoring range cannot be improved. A tool abnormality determination system according to the present disclosure has been made in consideration of the above-described problems. An object of the present disclosure is to provide a tool abnormality determination system capable of easily improving the precision of a monitoring range.

Solution to Problem

In order to solve the above-described problems, according to the present disclosure, there may be provided a tool abnormality determination system including: a tool that machines a workpiece; a control device that includes a storage portion in which a monitoring range is stored and an arithmetic portion for comparing the monitoring range to a load of the tool during machining; and an interface device that can notify, when the load of the tool exceeds the monitoring range, an operator of a question regarding whether or not the tool is in an abnormal condition other than abrasion.

"The load" of the tool described herein refers to at least one of a load (for example, a torque, a current, or a voltage) of an actuator which moves the tool and a load of an actuator which moves a workpiece. In addition, "the abnormal condition other than abrasion" refers to the chipping of the tool, the deviation of the tool from a mounting position, the breakage of the tool, the fracture of the tool, the non-mounting of the tool, or the jamming of chips at a machining point.

When the load of the tool exceeds the monitoring range, the interface device of the tool abnormality determination system according to the present invention notifies the operator of the question regarding whether or not the tool is in an abnormal condition other than abrasion. The operator can check whether or not the tool is actually in the abnormal condition by directly or indirectly checking the tool. That is, the operator can recognize the validity of the monitoring range. Therefore, the precision of the monitoring range can be easily improved.

In addition, according to the tool abnormality determination system of the present disclosure, since the precision of the monitoring range is high, a stable machining surface of the tool can be secured. In addition, since the precision of the monitoring range ishigh, the tool can be used until the abnormal condition occurs.

The abnormal condition may be at least one of the chipping of the tool, the non-mounting of the tool, and the jamming of chips of the workpiece. According to this configuration, regarding at least one of the chipping of the tool, the non-mounting of the tool, and the jamming of chips of the workpiece, the precision of the monitoring range can be improved.

One machining operation on the single workpiece may be set to one cycle; and the control device may execute the following steps including: a sampling step of sampling load data regarding the load of the workpiece of the cycle in a state where the interface device cannot notify the operator of the question; a peak hold step of acquiring a low-load-side peak hold value and a high-load-side peak hold value based on the sampled load data; and a monitoring range setting step of setting a lower limit threshold value, which is obtained by correcting the low-load-side peak hold value downward using an offset amount, and an upper limit threshold value, which is obtained by correcting the high-load-side peak hold value upward using the offset amount, and setting a distance between the lower limit threshold value and the upper limit threshold value to the monitoring range.

Accordingly, the control device can execute the sampling step, the peak hold step, and the monitoring range setting step. In the sampling step, the load data of the cycle is sampled.

In the peak hold step, the low-load-side peak hold value and the high-load-side peak hold value are acquired based on the load data. For example, when there are plural pieces of load data, the plural pieces of load data are made to overlap with each other so as to correspond to machining points (machining positions of arbitrary machining parts of the workpiece). At each machining point, a load of load data having the smallest load among the plural pieces of load data is set to the low-load-side peak hold value. In addition, at each machining point, a load of load data having the largest load among the plural pieces of load data is set to the high-load-side peak hold value.

In the monitoring range setting step, the low-load-side peak hold value and the high-load-side peak hold value are corrected using the offset amount. The lower limit threshold value and the upper limit threshold value are set. That is, the monitoring range is set.

During the sampling step, the peak hold step, and the monitoring range setting step, the interface device does not notify the operator of the question regarding whether or not the tool is in an abnormal condition other than abrasion.

Accordingly, the monitoring range is set based on the load data which is actually sampled. That is, the monitoring range is set based on the low-load-side peak hold value and the high-load-side peak hold value. Therefore, unlike the method of monitoring a machining load disclosed in PTL 1, confused arithmetic processing is unnecessary.

The sampling step, the peak hold step, and the monitoring range setting step may be repeatedly executed in this order N times (wherein N is a natural number of 2 or more).

Accordingly, the low-load-side peak hold value and the high-load-side peak hold value can be updated for each sampling of the load data (except for the first cycle). In addition, the lower limit threshold value and the upper limit threshold value can be updated. That is, the monitoring range can be updated.

After the sampling step and the peak hold step are repeated in this order N times (wherein N is a natural number of 2 or more), the monitoring range setting step may be executed.

Accordingly, the low-load-side peak hold value and the high-load-side peak hold value can be updated for each sampling of the load data (except for the first cycle). In addition, the lower limit threshold value can be collectively set for the low-load-side peak hold values based on the load data corresponding to the N times of cycles. Likewise, the upper limit threshold value can be collectively set for the high-load-side peak hold values based on the load data corresponding to the N times of cycles.

After the sampling step is repeated N times (wherein N is a natural number of 2 or more), the peak Accordingly, the low-load-side peak hold value and the high-load-side peak hold value can be collectively acquired for the load data corresponding to the N times of cycles. In addition, the lower limit threshold value can be set for the low-load-side peak hold value. Likewise, the upper limit threshold value can be set for the high-load-side peak hold value.

The offset amount may be a value relative to the distance between the low-load-side peak hold value and the high-load-side peak hold value.

For example, at a machining point having a narrow distance between the low-load-side peak hold value and the high-load-side peak hold value, variations in loads between multiple cycles are small. Therefore, the monitoring range may be narrow. On the other hand, at a machining point having a wide distance between the low-load-side peak hold value and the high-load-side peak hold value, variations in loads between multiple cycles are large. Therefore, it is preferable that the monitoring range be wide.

On the other hand, the offset amount according to the configuration is a value relative to the distance between the low-load-side peak hold value and the high-load-side peak hold value. Therefore, the monitoring range can change depending on the variations in the loads between multiple cycles. That is, the lower limit threshold value and the upper limit threshold value can be adjusted at each machining point.

The interface device may include a cause input portion; the load data of the first cycle may be set to reference data; and, when the load data of the second or subsequent cycle exceeds an instruction lower limit threshold value which is disposed below the reference data or an instruction upper limit threshold value which is disposed above the reference data in the sampling step, a cause for the excess may be input to the cause input portion by the operator.

That is, in this configuration, the possibility that the tool may be in the abnormal condition in the sampling step is considered. When the tool is in the abnormal condition in the second or subsequent cycle, load data is significantly different from the reference data. When such load data is reflected on the monitoring range, the precision of the monitoring range is decreased.

On the other hand, according to the configuration, the reason why the load data exceeds the instruction lower limit threshold value or the instruction upper limit threshold value is input to the cause input portion by the operator. Therefore, based on the input reason, the control device can react as follows: ($\alpha$) can discard all the load data; ($\beta$) can acquire the low-load-side peak hold value and the high-load-side peak hold value from the load data from which the exceeding values are excluded; or ($\gamma$) can start over the sampling step from the beginning.

The interface device may include an abnormality button for an input indicating that the tool is in the abnormal condition and a normality button for an input indicating that the tool is not in the abnormal condition; when the operator presses the abnormality button in response to the question, the control device may not update the monitoring range; and, when the operator presses the normality button in response to the question, the control device may update the monitoring range.

When the load of the tool exceeds the monitoring range, the interface device notifies the operator of the question regarding whether or not the tool is in an abnormal condition other than abrasion. In response to the question, for example, the operator opens a door of a stopped machining machine to check the tool condition.

When the tool is actually in the abnormal condition as a result of checking by the operator, the operator presses the abnormality button. In this case, it can be considered that the control device has been able to determine the abnormal condition of the tool. Since the determination of the control device is appropriate, the control device does not update the monitoring range. On the other hand, when the tool is actually in the normal condition as a result of checking by the operator, the operator presses the normality button. In this case, it can be considered that the control device has not been able to determine the normal condition of the tool. Since the determination of the control device is inappropriate, the control device updates the monitoring range. According to the configuration, when the control device erroneously determines the tool condition, the monitoring range can be updated. Therefore, the precision of the monitoring range can be improved.

The abnormal condition may include a main abnormal condition which is an update target of the monitoring range and a sub abnormal condition which is not an update target of the monitoring range; the abnormality button may include a main abnormality button for an input indicating that the tool is in the main abnormal condition and a sub abnormality button for an input indicating that the tool is in the sub abnormal condition; when the operator presses the main abnormality button or the sub abnormality button in response to the question, the control device may not update the monitoring range; and, when the operator presses the normality button in response to the question, the control device may update the monitoring range.

Accordingly, the main abnormality condition corresponds to the main abnormality button. In addition, the sub abnormality condition corresponds to the sub abnormality button. The control device can store a button which is pressed among the main abnormality button and the sub abnormality button in the storage portion. Therefore, data regarding the abnormal condition can be easily collected, and an abnormality factor can be easily classified.

The control device may execute a monitoring period setting step of setting a monitoring period in which whether or not the load of the tool exceeds the monitoring range is monitored.

When the tool which has been in an air-cutting operation in an initial period of machining comes into contact with the workpiece, the load of the tool significantly increases at the moment. At this time, when there is a variation in the size of the workpiece, a time period where a load is generated or a change ratio of the load (=load (for example, a torque or a current applied to a spindle)/time (or a position of the tool)) varies. For example, when the workpiece is large, the time period where a load is generated is advanced. In addition, the change ratio of the load is increased. In addition, when there are burrs in the workpiece, the change ratio of the load is increased. In this way, due to the effect of a disturbance factor, there is a period where a load is unstable.

When the control device monitors a load in the period where a load is unstable, the load frequently exceeds the monitoring range. Therefore, although the tool is not actually in the abnormal condition, the interface device notifies the operator of the question regarding whether or not the tool is in an abnormal condition. That is, erroneous determination based on the disturbance factor of a load is frequently made. Accordingly, the operator is confused.

On the other hand, according to the configuration, the control device sets a monitoring period for monitoring a load (for example, between two arbitrary time points or between two arbitrary positions during the machining of a workpiece). When the monitoring period is exceeded, the control device does not monitor a load. Therefore, a period, such as at the above-described initial period of machining, where a load is likely to be affected by a disturbance factor can be intentionally excluded from the monitoring period to suppress the occurrence of erroneous determination. Accordingly, the confusion of the operator can be reduced.

The control device may compare a continuous excess number, which is the number of times at which the load of the tool continuously exceeds the monitoring range, to an continuous excess number threshold value; and, when the continuous excess number exceeds the continuous excess number threshold value, the interface device may notify an operator of a question regarding whether or not the tool is in an abnormal condition other than abrasion.

For example, when dust is attached on the workpiece, the load of the tool exceeds the monitoring range. For example, the hardness of the workpiece is partially changed. That is, due to an abrupt disturbance factor, the load exceeds the monitoring range. Therefore, although the tool is not actually in the abnormal condition, the interface device notifies the operator of the question regarding whether or not the tool is in an abnormal condition. That is, erroneous determination based on the abrupt disturbance factor of a load is made. Accordingly, the operator is confused.

On the other hand, according to the configuration, the control device counts the number of times at which the load exceeds the monitoring range. In addition, the control device compares the continuous excess number, which is the number of times at which the load continuously exceeds the monitoring range, to the continuous excess number threshold value.

When the continuous excess number exceeds the continuous excess number threshold value as a result of the comparison, the interface device notifies the operator of the question regarding whether or not the tool is in an abnormal condition other than abrasion. On the other hand, when the continuous excess number is less than or equal to the continuous excess number threshold value as a result of the comparison, the interface device does not notify the operator of the question regarding whether or not the tool is in an abnormal condition other than abrasion. Therefore, when the load exceeds the monitoring range due to the effect of an abrupt disturbance factor, the occurrence of erroneous determination can be suppressed. Accordingly, the confusion of the operator can be reduced.

Advantageous Effects of Invention

According to the present disclosure, a tool abnormality determination system capable of easily improving the precision of a monitoring range can be provided.

BRIEF DESCRIPTION OF DRAWINGS

FIG. 1 is a front view illustrating a lathe of a tool abnormality determination system according to a first embodiment of the present disclosure.

FIG. 8 is a diagram illustrating a monitoring range after being updated in an update step of the tool abnormality determination method.

FIG. 11 is a diagram illustrating load data in a machining step of the tool abnormality determination method.

REFERENCE SIGNS LIST

1: LATHE
2: TOOL ABNORMALITY DETERMINATION SYSTEM
3: CHUCK DEVICE
4: TABLE
5: BED
6: SLIDE PORTION
7: COLUMN
8: CUTTING TOOL REPLACEMENT TABLE
20: TOOL TABLE
22: CONTROL DEVICE
23: SCREEN (INTERFACE DEVICE)
28: CUTTING TOOL (TOOL)
40: TABLE MAIN BODY
41: SPINDLE
42: SPINDLE MOTOR
60: X-AXIS SLIDE PORTION
60A: X-AXIS LOWER SLIDE
60B: X-AXIS SLIDE
61: Z-AXIS SLIDE PORTION
61A: Z-AXIS LOWER SLIDE
61B: Z-AXIS SLIDE
62: BALL SCREW PORTION
63: Z-AXIS MOTOR
71: BALL SCREW PORTION
72: X-AXIS MOTOR
220: COMPUTER
220A: STORAGE PORTION
220B: ARITHMETIC PORTION
221: INPUT-OUTPUT INTERFACE
222: MOTOR DRIVE CIRCUIT
230: "YES" BUTTON (MAIN ABNORMALITY BUTTON)
231: "NO" BUTTON (NORMALITY BUTTON)
232: "CANCEL" BUTTON (SUB ABNORMALITY BUTTON)
233: QUESTION
A: CYCLE
A1: MACHINING PART
A2: MACHINING PART
B: REFERENCE DATA
B1: REFERENCE DATA
B2: REFERENCE DATA
C1: LOW-LOAD-SIDE PEAK HOLD VALUE
C2: HIGH-LOAD-SIDE PEAK HOLD VALUE
D1: LOWER LIMIT THRESHOLD VALUE
D2: UPPER LIMIT THRESHOLD VALUE
ΔD: MONITORING RANGE
E1: LOAD DATA
E2: LOAD DATA
F1: INSTRUCTION LOWER LIMIT THRESHOLD VALUE
F2: INSTRUCTION UPPER LIMIT THRESHOLD VALUE
P1 TO P4: MACHINING POINTS
P5: START POINT
P6: END POINT
P10 TO P20: LOAD DATA
ΔP: MONITORING PERIOD
W: WORKPIECE
C1: LOW-LOAD-SIDE PEAK HOLD VALUE
C2: HIGH-LOAD-SIDE PEAK HOLD VALUE

DESCRIPTION OF EMBODIMENTS

Hereinafter, embodiments of a tool abnormality determination system according to the present disclosure will be described.

<<First Embodiment>>

<Configuration of Lathe>

Figure 2:
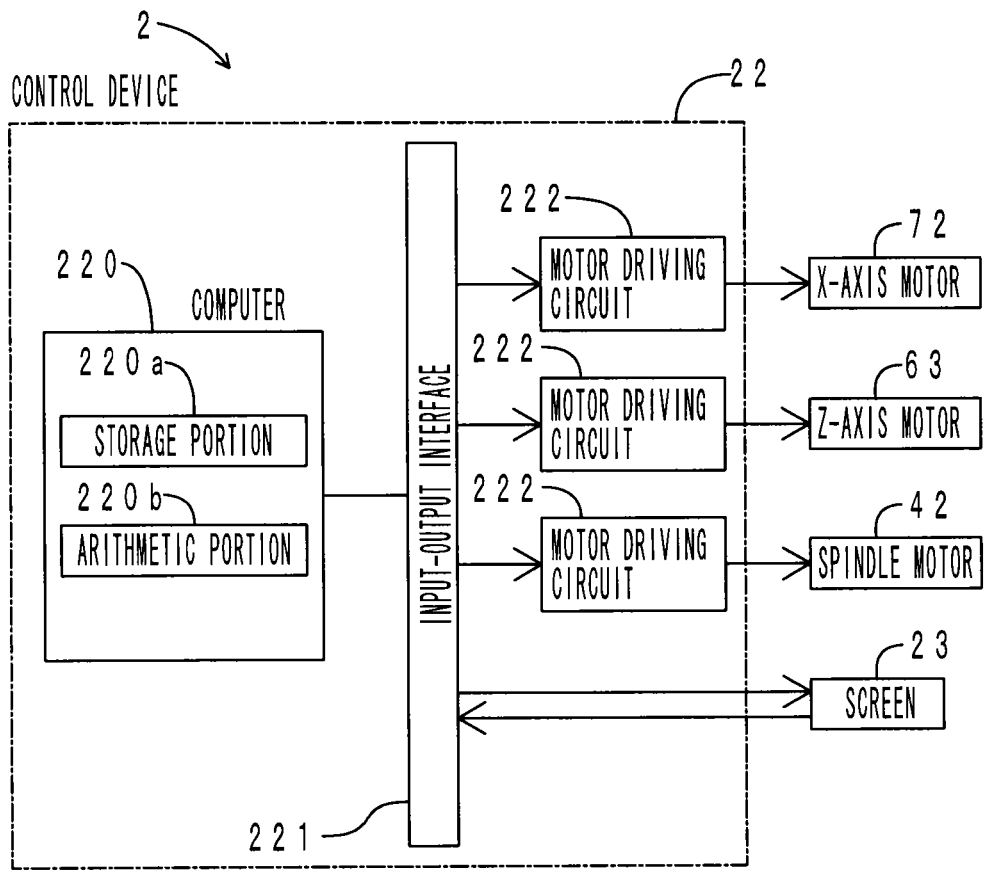
FIG. 2 is a block diagram illustrating the lathe.

First, a configuration of a lathe including a tool abnormality determination system according to an embodiment of the present disclosure will be described. FIG. 1 is a front view illustrating the lathe including the tool abnormality determination system according to the embodiment. FIG. 2 is a block diagram illustrating the lathe. As illustrated in FIGS. 1 and 2, the lathe 1 according to the embodiment includes the tool abnormality determination system 2, a chuck device 3, a table 4, a bed 5, a slide portion 6, a column 7, and a cutting tool replacement table 8.

[Chuck Device 3, Table 4, Head 5, Column 7, Cutting Tool Replacement Table 8]

The table 4 includes a table main body 40 and a spindle 41. The spindle 41 is housed in the bed 5. An upper end of the spindle 41 protrudes from a front upper surface of the bed 5. The table main body 40 is fixed to the upper end of the spindle 41.

The chuck device 3 is fixed to an upper surface of the table main body 40. The chuck device 3 can fix and release a workpiece W. The workpiece W, the chuck device 3, and the table 4 can be rotated around an axis in a horizontal surface by a driving force transmitted from a spindle motor 42 to the spindle 41.

The column 7 is disposed on a front upper portion of a rear portion of the bed 5. The column 7 includes a ball screw portion 71 and an X-axis motor 72. The ball screw portion 71 extends in left and right directions. A driving shaft of the X-axis motor 72 is linked to a shaft portion of the ball screw portion 71. The cutting tool replacement table 8 is attached to a right surface of the bed 5.

[Slide Portion 6]

The slide portion 6 includes an X-axis slide portion 60, a Z-axis slide portion 61, a ball screw portion 62, and a Z-axis motor 63.

The X-axis slide portion 60 includes an X-axis lower slide 60a and an X-axis slide 60b. The X-axis lower slide 60a is fixed to a front portion of the column 7. The X-axis lower slide 60a extends in the left and right directions (corresponding to an X-axis direction). The X-axis slide 60b can move relative to the X-axis lower slide 60a in the left and right directions. A nut portion of the ball screw portion 62 is attached to the X-axis slide 60b. A driving force of the X-axis motor 72 is transmitted to the X-axis slide 60b through a shaft portion and the nut portion of the ball screw portion 62. That is, the X-axis slide 60b can move in the left and right directions due to the driving force of the X-axis motor 72.

The Z-axis slide portion 61 includes a Z-axis lower slide 61a and a Z-axis slide 61b. The Z-axis lower slide 61a extends in up and down directions (corresponding to a Z-axis direction). The Z-axis lower slide 61a is arranged on a front portion of the X-axis slide 60b. The Z-axis slide 61b can move relative to the Z-axis lower slide 61a in the up and down directions.

The ball screw portion 62 extends in the up and down directions. The Z-axis motor 63 is arranged on an upper end of the Z-axis lower slide 61a. A driving shaft of the Z-axis motor 63 is linked to the shaft portion of the ball screw portion 62. On the other hand, the nut portion of the ball screw portion 62 is attached to the Z-axis slide 61b. A driving force of the Z-axis motor 63 is transmitted to the Z-axis slide 61b through the shaft portion and the nut portion of the ball screw portion 62. That is, the Z-axis slide 61b can move in the up and down directions due to the driving force of the Z-axis motor 63.

[Tool Abnormality Determination System 2]

The tool abnormality determination system 2 includes a tool table 20, a control device 22, a screen 23, and a cutting tool 28. The screen 23 is included in the concept of "the interface device" according to the present disclosure. The cutting tool 28 is included in the concept of "the tool" according to the present disclosure.

The tool table 20 is arranged on a lower end of the Z-axis slide 61b. The cutting tool 28 is replaceably attached to the tool table 20. The workpiece W is cut by a blade provided at a tip end of the cutting tool 28. The tool table 20 and the cutting tool 28 are driven by the X-axis slide portion 60 and the Z-axis slide portion 61 in the up, down, left, and right directions. In the cutting tool replacement table 8, plural cutting tools 28 are prepared depending on the machining part of the workpiece W.

The control device 22 includes a computer 220, an input-output interface 221, and plural motor driving circuits 222. The computer 220 includes a storage portion 220a and an arithmetic portion 220b. In the storage portion 220a, a monitoring range (a lower limit threshold value and an upper limit threshold value) described below is stored. The monitoring range can be updated. The input-output interface 221 is connected to the computer 220. In addition, the input-output interface 221 is connected to the X-axis motor 72, the Z-axis motor 63, and the spindle motor 42 through the motor driving circuits 222. In addition, the input-output interface 221 is connected to the screen 23.

<Tool Abnormality Determination Method>

Next, a tool abnormality determination method which is performed using the tool abnormality determination system according to the embodiment will be described. The tool abnormality determination method includes a sampling step, a peak hold step, a monitoring range setting step, a machining step, an update step, and a manual update step.

[Sampling Step and Peak Hold Step]

Figure 3:
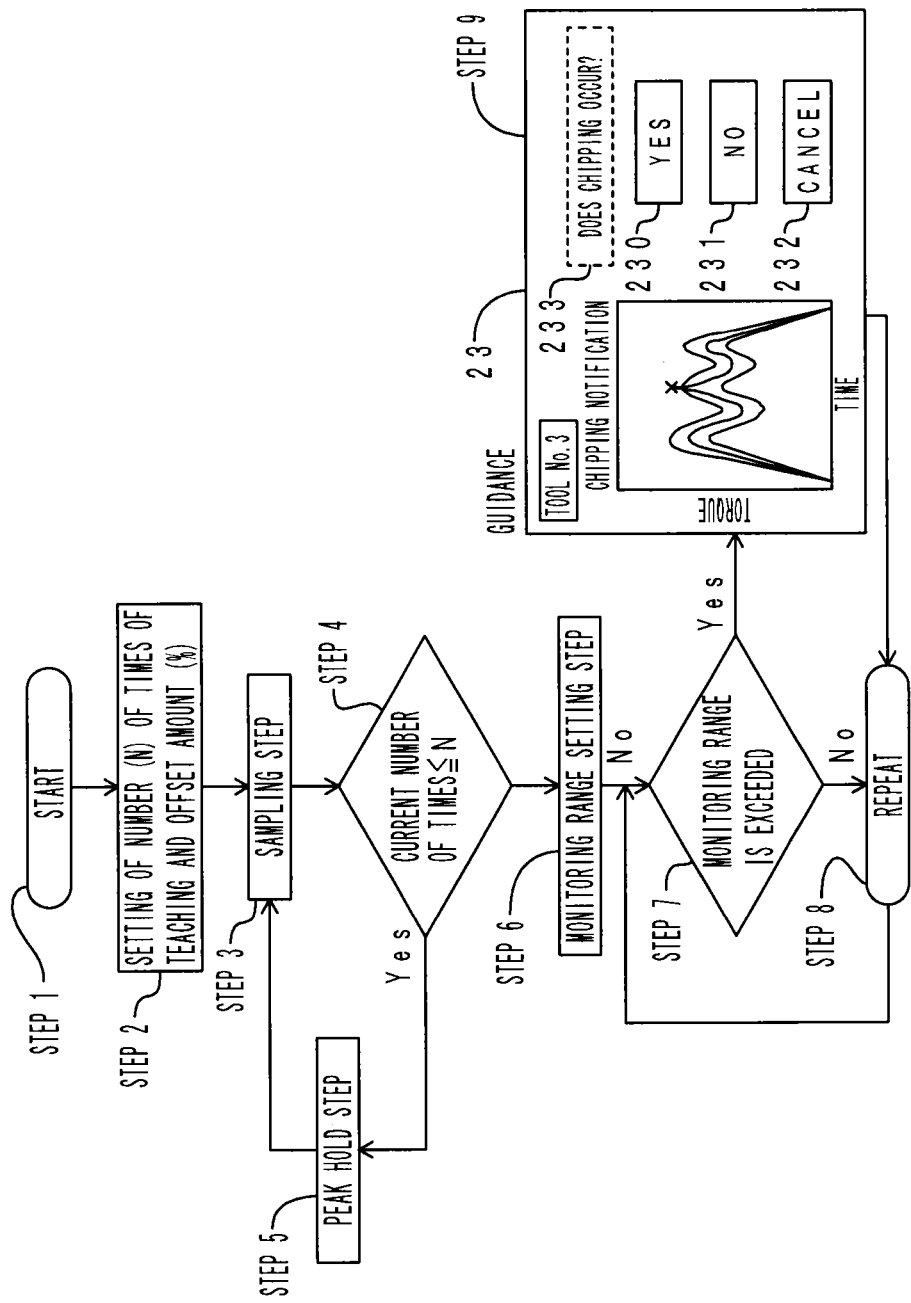
FIG. 3 is a flowchart illustrating a tool abnormality determination method which is performed using the tool abnormality determination system according to the first embodiment.
Figure 4:
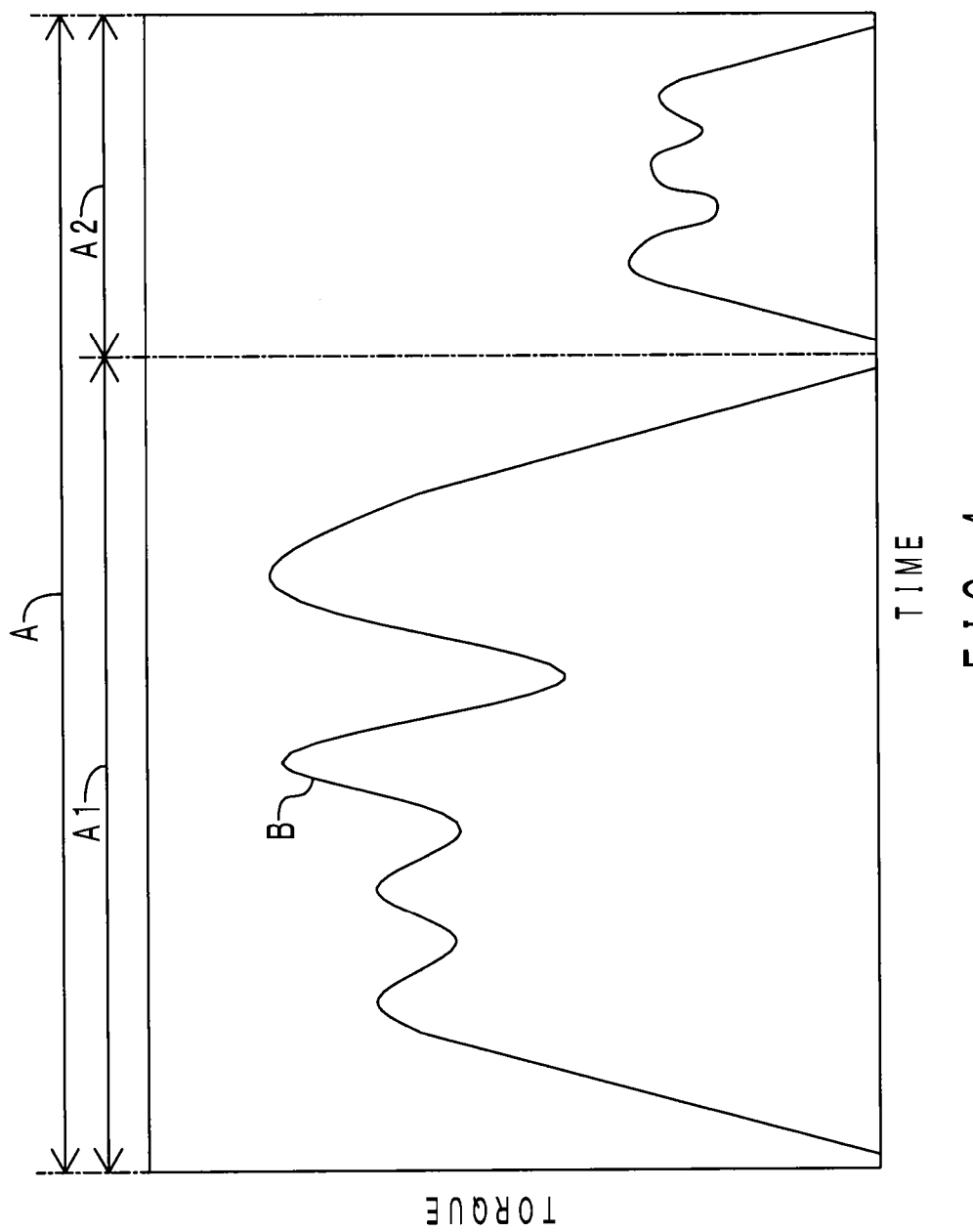
FIG. 4 is a diagram illustrating load data of a first cycle of a sampling step in the tool abnormality determination method.
Figure 5:
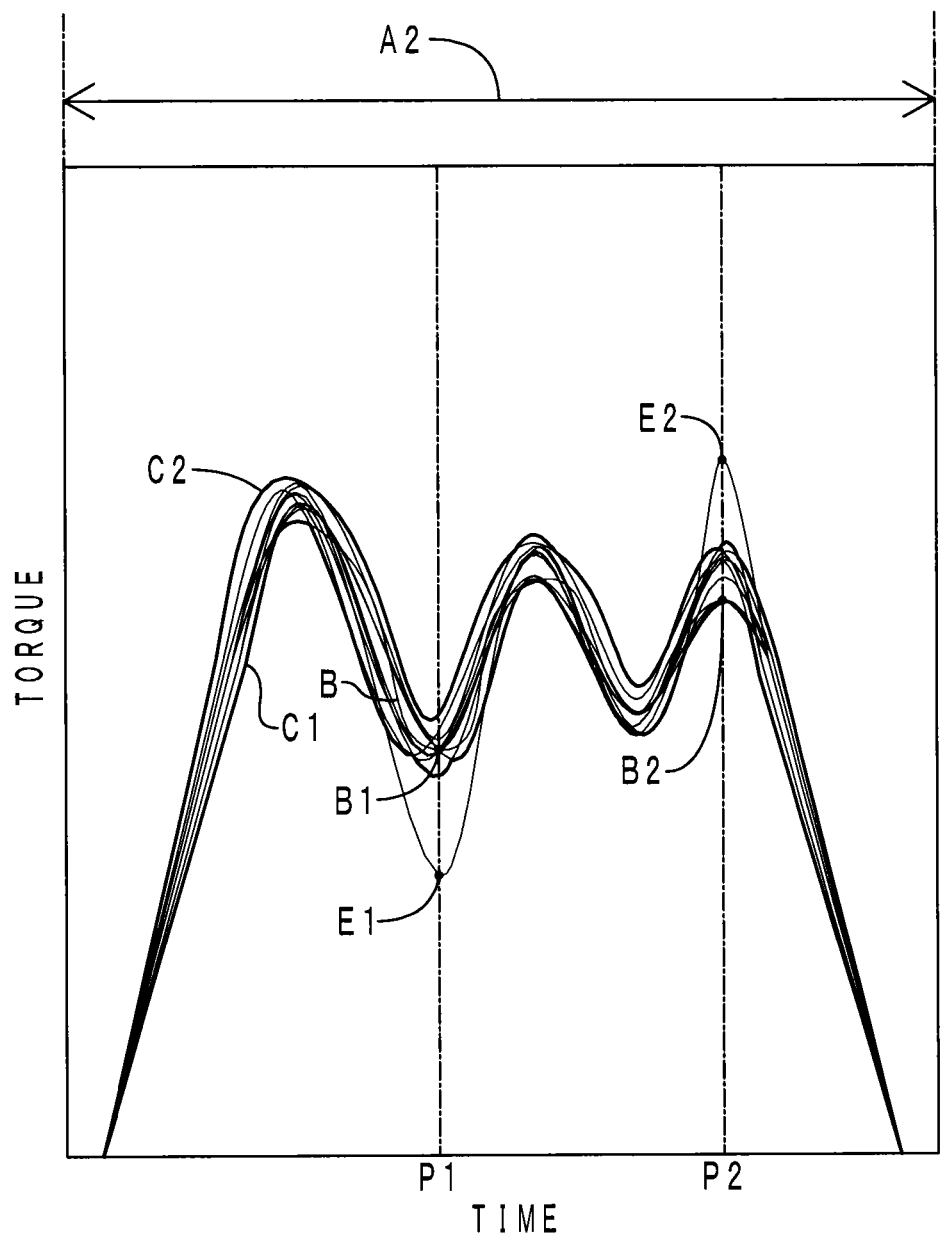
FIG. 5 is a diagram illustrating a low-load-side peak hold value and a high-load-side peak hold value which are set in a peak hold step of the tool abnormality determination method.

FIG. 3 is a flowchart illustrating the tool abnormality determination method which is performed using the tool abnormality determination system according to the embodiment. FIG. 4 is a diagram illustrating load data of a first cycle of the sampling step in the tool abnormality determination method. FIG. 5 is a diagram illustrating a low-load-side peak hold value and a high-load-side peak hold value which are set in a peak hold step of the tool abnormality determination method.

In FIG. 5, only a machining part A2 is illustrated for convenience of description. In addition, in FIG. 5, a low-load-side peak hold value C1 and a high-load-side peak hold value C2 obtained after the tenth sampling step are illustrated. In addition, in a machining part A1 of FIG. 4, as in the machining part A2 of FIG. 5, the low-load-side peak hold value C1 and the high-load-side peak hold value C2 are set.

The control device 22 of FIG. 2 repeats the sampling step and the peak hold step in this order ten times (=N (the number of cycles)). That is, cutting load data is collected from ten workpieces W.

During the execution of the sampling step, the peak hold step, and the monitoring range setting step described below, a question 233 "does chipping occur?" is not displayed on the screen 23.

Specifically, first, the operator inputs "number of times of teaching=10" and "offset amount=5%" to the control device 22 through the screen 23 of FIG. 2 (Steps 1 and 2 in FIG. 3). Next, the control device 22 drives the spindle motor 42 to rotate the chuck device 3, that is, the workpiece W around the axis of the spindle motor 42. Next, the control device 22 drives the X-axis motor 72 and the Z-axis motor 63 to appropriately move the cutting tool in the left, right, up, and down directions. As a result, a predetermined machining part of the workpiece W is cut. That is, the sampling step starts (Step 3 in FIG. 3). As illustrated in FIG. 4, during a first cycle A (machining of one workpiece W), the control device 22 causes two machining parts A1 (for example, an outer peripheral surface) and A2 (for example, an upper end surface) to be sequentially cut. The cutting tool 28 is appropriately replaced with another one according to the angles, the shapes, and the like of the machining parts A1 and A2. As illustrated in FIG. 4, when the machining parts A1 and A2 are compared to each other, torque (load) values and variations in torque are different from each other, respectively. The control device 22 of FIG. 2 stores load data (torque data) of the first cycle A of FIG. 4 in the storage portion 220a as reference data B.

When the current number of times of the cycles A is or less (Step 4 in FIG. 3), the control device 22 repeats the sampling step (Step 3 in FIG. 3) and the peak hold step (Step 5 in FIG. 3). That is, the peak hold step is executed whenever the cycle A is completed once.

For example, when the second cycle A is completed, the control device 22 compares the load data of the first cycle A to load data of the second cycle A at each machining point of each of the machining parts A1 and A2. In this case, machining paths of the machining parts A1 and A2 in each cycle A are fixed. Therefore, the time of the horizontal axis in FIGS. 4 and 5 corresponds to the machining points of the workpiece W. The control device 22 overlaps the load data corresponding to the two times of cycles so as to correspond to the machining points. At each machining point, a load of load data having a smaller load among the two pieces of load data corresponding to the two times of cycles is set to a low-load-side peak hold value. In addition, at each machining point, a load of load data having a larger load among the two pieces of load data corresponding to the two times of cycles is set to a high-load-side peak hold value.

As illustrated in FIG. 5, when load data corresponding to ten times of cycles overlap with each other, the load data forms a belt shape. Through the tenth peak hold step (Step 5 in FIG. 3), as indicated by a thick line in FIG. 5, the control device 22 of FIG. 2 acquires the low-load-side peak hold value C1 corresponding to the ten times of cycles which is continuous in a curved shape. Moreover, as indicated by a thick line in FIG. 5, the control device 22 acquires the high-load-side peak hold value C2 corresponding to the ten times of cycles which is continuous in a curved shape.

The control device 22 of FIG. 2 stores the load data corresponding to the ten times of cycles, the low-load-side peak hold value C1, and the high-load-side peak hold value C2, which are illustrated in FIG. 5, in the storage portion 220a.

In this case, among the plural pieces of load data corresponding to the ten times of cycles, load data may significantly deviate from the reference data B of FIG. 4. For example, at a machining point P1 of FIG. 5, load data E1 significantly deviates downward from reference data B1. Moreover, at a machining point P2, load data E2 significantly deviates upward from reference data B2.

When an instruction offset amount is represented by h(=10%) and a torque of the reference data B1 or B2 of the arbitrary machining point P1 or P2 is represented by t, an instruction lower limit threshold value F1 is calculated from the following expression.

$$F1=t-(t\times h) \quad \text{Expression (1)}$$

Likewise, an instruction upper limit threshold value F2 is calculated from the following expression.

$$F2=t+(t\times h) \quad \text{Expression (2)}$$

The load data E1 falls below the instruction lower limit threshold value F1. Therefore, when the low-load-side peak hold value C1 is acquired, the load data E1 is excluded. In addition, the load data E2 exceeds the instruction upper limit threshold value F2. Therefore, when the high-load-side peak hold value C2 is acquired, the load data E2 is automatically excluded.

In this way, among the plural pieces of load data, load data exceeding the instruction lower limit threshold value F1 and the instruction upper limit threshold value F2 are excluded when the low-load-side peak hold value C1 and the high-load-side peak hold value C2 are acquired. The control device 22 of FIG. 2 stores the instruction offset amount h, the instruction lower limit threshold value F1, and the instruction upper limit threshold value F2 in the storage portion 220a.

[Monitoring Range Setting Step]

Figure 6:
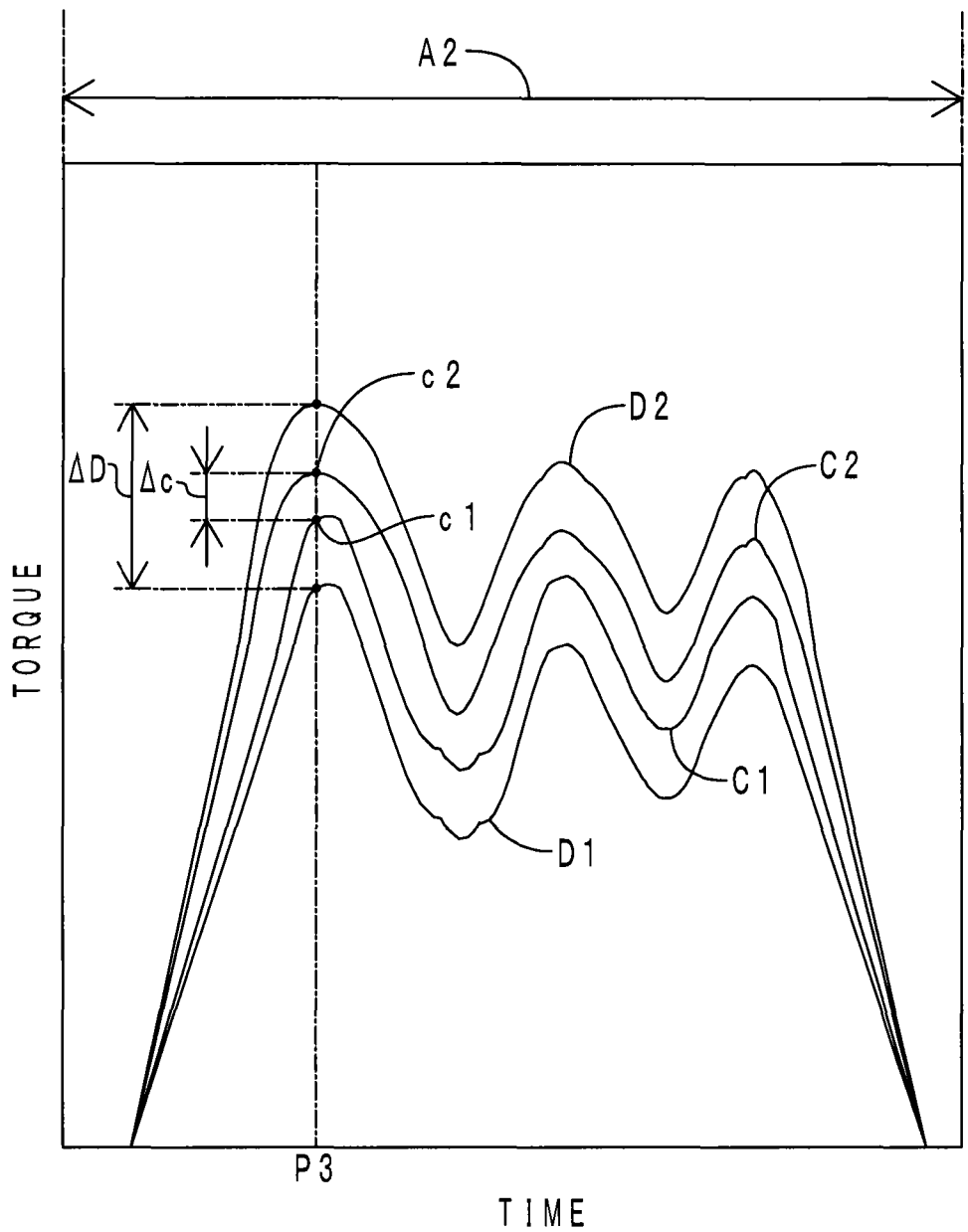
FIG. 6 is a diagram illustrating a monitoring range which is set in a monitoring range setting step of the tool abnormality determination method.

FIG. 6 is a diagram illustrating a monitoring range which is set in the monitoring range setting step of the tool abnormality determination method which is performed using the tool abnormality determination system according to the embodiment. For convenience of description, only the machining part A2 is illustrated. In addition, the control device 22 of FIG. 2 sets a monitoring range ΔD not only for the machining part A2 of FIG. 6, but also for FIG. 2 sets a monitoring range ΔD not only for the machining part A2 of FIG. 6, but also for the machining part A1 of FIG. 4.

In this step, based on the low-load-side peak hold value C1 and the high-load-side peak hold value C2 which are obtained in the previous step, the control device 22 sets the monitoring range ΔD (Step 6 in FIG. 3). Specifically, the control device 22 corrects the low-load-side peak hold value C1 and the high-load-side peak hold value C2 using the offset amount (=5%) set in Step 2 of FIG. 3. Next, a lower limit threshold value D1 and an upper limit threshold value D2 are calculated.

When the offset amount is represented by H (=5%) and a difference between the low-load-side peak hold value c1 and the high-load-side peak hold value c2 at an arbitrary machining point P3 is represented by Δc, the lower limit threshold value D1 is calculated from the following expression.

$$D1=c1-(\Delta c\times H) \quad \text{Expression (3)}$$

Likewise, the upper limit threshold value D2 is calculated from the following expression.

$$D2=c2+(\Delta c\times H) \quad \text{Expression (4)}$$

The monitoring range ΔD is calculated from the following expression.

$$\Delta D=D2-D1 \quad \text{Expression (5)}$$

In this way, in this step, based on the low-load-side peak hold value C1 and the high-load-side peak hold value C2, the control device 22 of FIG. 2 sets the monitoring range ΔD. The control device 22 stores the offset amount H and the monitoring range ΔD (the lower limit threshold value D1 and the upper limit threshold value D2) in the storage portion 220a.

[Machining Step]

Figure 7:
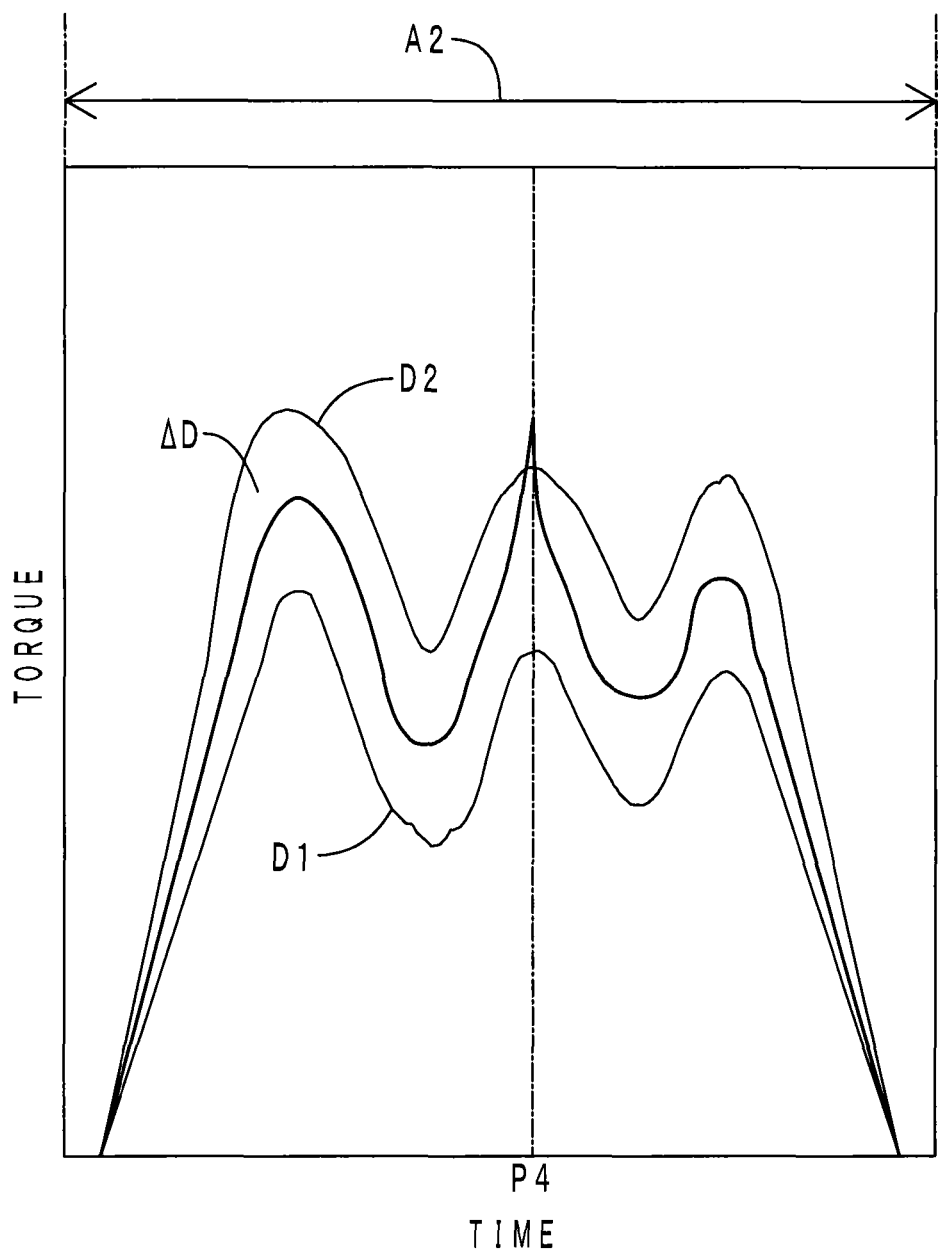
FIG. 7 is a diagram illustrating load data in a machining step of the tool abnormality determination method.

FIG. 7 is a diagram illustrating load data in the machining step of the tool abnormality determination method which is performed using the tool abnormality determination system according to the embodiment. For convenience of description, only the machining part A2 is illustrated. In this step, an eleventh or subsequent cycle A is executed using the monitoring range ΔD obtained in the previous step. That is, the workpiece W is actually cut using the monitoring range ΔD.

Specifically, the control device 22 of FIG. 2 drives the spindle motor 42 to rotate the chuck device 3, that is, the workpiece W around an axis of the spindle motor 42. Next, the control device 22 drives the X-axis motor 72 and the Z-axis motor 63 to appropriately move the cutting tool in the left, right, up, and down directions. As a result, the machining part A2 of the workpiece W is cut. When load data does not the monitoring range ΔD in an eleventh cycle A (Step 7 in FIG. 3), a twelfth cycle A is performed (Step 8 in FIG. 3).

On the other hand, when load data exceeds the monitoring range ΔD in the eleventh cycle A (Step 7 in FIG. 3), the control device 22 of FIG. 2 stops the lathe 1 after the machining of the machining part A2 is finished or at the time when the load data exceeds the monitoring range ΔD. In addition, the control device 22 causes guidance to be displayed on the screen 23 of FIG. 2 (Step 9 in FIG. 3). As illustrated in FIG. 3, the same load data as that of FIG. 7 is displayed on the screen 23. In addition, the question 233 "does chipping occur?" is displayed on the screen 23. In addition, as inputs in response to the question 233, a "YES" button 230, a "NO" button 231, and a "CANCEL" button 232 are displayed. The "YES" button 230 is included in the concept of "the main abnormality button" according to the present disclosure. The "NO" button 231 is included in the concept of "the normality button" according to the present disclosure. The "CANCEL" button 232 is included in the concept of "the sub abnormality button" according to the present disclosure.

The operator visually inspects the cutting tool 28 of FIG. 1. When the blade of the cutting tool 28 is chipped as a result of the visual inspection, the operator presses the "YES" button 230 on the screen 23. Chipping is included in the concept of "the main abnormal condition" according to the present disclosure. In addition, when the blade of the cutting tool 28 is not chipped and the cutting tool 28 is in the normal condition (for example, a condition in which the cutting tool 28 is simply abraded) as a result of the visual inspection, the operator presses the "NO" button 231 on the screen 23. In addition, when the blade of the cutting tool 28 is not chipped and the cutting tool 28 is in other abnormal conditions (for example, a condition in which the cutting tool 28 is jammed by chips of the workpiece W at a machining point P4 of FIG. 7, a condition in which the cutting tool 28 is not mounted on the tool table 20, a condition in which the operations of the X-axis motor 72, the Z-axis motor 63, and the spindle motor 42 of FIG. 2 are unusual, or a condition in which a cutting program stored in the storage portion 220a of FIG. 2 is unusual) as a result of the visual inspection, the operator presses the "CANCEL" button 232 on the screen 23. The jamming of chips of the workpiece W, the non-mounting of the cutting tool 28, and the malfunction of the X-axis operator presses the "CANCEL" button 232 on the screen 23. The jamming of chips of the workpiece W, the non-mounting of the cutting tool 28, and the malfunction of the X-axis motor 72, the Z-axis motor 63, and the spindle motor 42, and the malfunction of the cutting program are included in the concept of "the sub abnormality condition" according to the present disclosure.

When the "YES" button 230 or the "CANCEL" button 232 is pressed by the operator, a twelfth cycle A is performed (Step 8 in FIG. 3). In this case, the control device 22 does not update the monitoring range $\Delta D$.

[Update Step]

FIG. 8 is a diagram illustrating a monitoring range after being updated in the update step of the tool abnormality determination method which is performed using the tool abnormality determination system according to the embodiment. For convenience of description, only the machining part A2 is illustrated. In this step, only when the "NO" button 231 is pressed by the operator in the previous step, the monitoring range $\Delta D$ is updated.

When the "NO" button 231 is pressed by the operator, it can be considered that load data exceeds the upper limit threshold value D2 although the cutting tool 28 is in the normal condition. In this case, the control device of FIG. 2 executes peak hold using the load data exceeding the upper limit threshold value D2 among the plural pieces of load data of FIG. 7. Specifically, the control device 22 corrects the high-load-side peak hold value C2 of FIG. 6. Next, using the above-described expressions (3) to (5), the control device 22 calculates again the lower limit threshold value D1, the upper limit threshold value D2, and the monitoring range $\Delta D$.

As illustrated in a hatched portion of FIG. 8, the load data of FIG. 7 is reflected on the updated monitoring range $\Delta D$. The control device 22 of FIG. 2 stores the new monitoring range $\Delta D$ (the lower limit threshold value D1 and the upper limit threshold value D2) in the storage portion 220a. The control device 22 executes a twelfth or subsequent cycle A in the updated monitoring range $\Delta D$.

[Manual Update Step]

In this step, the monitoring range $\Delta D$ is manually updated by the operator. That is, at each machining point of the machining part A2, the operator adjusts the lower limit threshold value D1 and the upper limit threshold value D2. In order to execute the adjustment, the control device 22 of FIG. 2 switches the screen 23 into a numerical value input mode, and the operator inputs the lower limit threshold value D1 and the upper limit threshold value D2 onto the screen. The control device 22 causes the monitoring range $\Delta D$, on which the manually input lower limit threshold value D1 and the manually input upper limit threshold value D2 are reflected, to be displayed on the screen 23.

<Effects>

Next, the effects of the tool abnormality determination system 2 according to the embodiment will be described. As illustrated in FIG. 3, when a load of the cutting tool 28 exceeds the monitoring range $\Delta D$, the tool abnormality determination system 2 according to the embodiment notifies the operator of the question 233 "does chipping occur?". The operator can check whether the cutting tool 28 is actually in the abnormal condition by directly checking the cutting tool 28 or by indirectly checking the cutting tool 28 through load data or the like of the screen 23. That is, the operator can recognize the validity of the monitoring range $\Delta D$. Therefore, the precision of the monitoring range $\Delta D$ can be easily improved.

In addition, according to the tool abnormality determination system 2 of the embodiment, since the precision of the monitoring range $\Delta D$ is high, a stable cutting surface of the cutting tool 28 can be secured. In addition, since the precision of the monitoring range $\Delta D$ is high, the cutting tool 28 can be used until the abnormal condition occurs.

In the sampling step of the tool abnormality determination method, the control device 22 samples load data corresponding to the ten times of cycles A in total while executing peak hold in each cycle A (Step 5 in FIG. 3). Therefore, as illustrated in FIG. 5, the control device 22 can set a load of load data having the smallest load among the plural pieces of load data corresponding to the ten times of cycles to the low-load-side peak hold value C1. In addition, the control device 22 can set a load of load data having the largest load among the plural pieces of load data corresponding to the ten times of cycles to the high-load-side peak hold value C2.

In this way, according to the tool abnormality determination system 2 of the embodiment, the control device 22 overlaps the actually sampled load data with each other. As a result, the low-load-side peak hold value C1 and the high-load-side peak hold value C2 are set. In addition, the control device 22 sets the monitoring range $\Delta D$ based on the low-load-side peak hold value C1 and the high-load-side peak hold value C2. Therefore, confused arithmetic processing is unnecessary, and the tool condition can be visually checked easily.

In addition, in the sampling step, the peak hold step, and the monitoring range setting step, the question regarding whether or not the cutting tool 28 is in the abnormal condition is not displayed on the screen 23 of FIG. 3. Therefore, the sampling step, the peak hold step, and the monitoring range setting step can be smoothly executed.

In addition, in the peak hold step, as illustrated in FIG. 5 and the expressions (1) and (2), among the plural pieces of load data, load data exceeding the instruction lower limit threshold value F1 and the instruction upper limit threshold value F2 are excluded when the low-load-side peak hold value C1 and the high-load-side peak hold value C2 are acquired. Therefore, there is little concern that abnormal load data is reflected on the monitoring range $\Delta D$. Accordingly, the precision of the monitoring range $\Delta D$ can be improved.

In the monitoring range setting step of the tool abnormality determination method, the control device 22 sets the monitoring range $\Delta D$ from the above-described expressions (3) to (5). In this case, as illustrated in FIG. 6, the lower limit threshold value D1 and the upper limit threshold value D2 change depending on the difference $\Delta c$ between the low-load-side peak hold value c1 and the high-load-side peak hold value c2.

That is, at a machining point in which the difference $\Delta c$ is large, in other words, at a machining point in which variations in the load data corresponding to the ten times of cycles is large in the sampling step, the lower limit threshold value D1 is significantly less than the low-load-side peak hold value c1. In addition, the upper limit threshold value D2 is significantly larger than the high-load-side peak hold value C2. Therefore, the monitoring range $\Delta D$ is increased.

That is, at a machining point in which the difference $\Delta c$ is small, in other words, at a machining point in which variations in the load data corresponding to the ten times of cycles is small in the sampling step, the lower limit threshold value D1 is slightly less than the low-load-side peak hold value c1. In addition, the upper limit threshold value D2 is slightly larger than the high-load-side peak hold value C2. Therefore, the monitoring range $\Delta D$ is narrowed. In this way, according to the tool abnormality determination system 2 of the embodiment, the distance (monitoring range $\Delta D$) between the lower limit threshold value D1 and the upper limit threshold value D2 can be changed depending on the machining points of the workpiece W.

In the machining step of the tool abnormality determination method, an eleventh or subsequent cycle A is executed. That is, using the set monitoring range ΔD, the workpiece W is actually cut. In the machining step, as illustrated in Step 9 of FIG. 3, when a load of the cutting tool 28 exceeds the monitoring range ΔD, the screen 23 notifies the operator of the question 233 "does chipping occur?". In response to the question, the operator checks the condition of the cutting tool 28.

When the cutting tool 28 is actually chipped as a result of checking by the operator, the operator presses the "YES" button 230. In this case, it can be considered that the control device 22 has been able to determine the chipping of the cutting tool 28. Since the determination of the control device 22 is appropriate, the control device 22 does not update the monitoring range ΔD. On the other hand, when the cutting tool 28 is actually in the normal condition (for example, a condition in which the cutting tool 28 is simply abraded) as a result of checking by the operator, the operator presses the "NO" button 230. In this case, it can be considered that the control device 22 has not been able to determine the normal condition of the cutting tool 28. Since the determination of the control device 22 is inappropriate, the control device 22 updates the monitoring range ΔD (update step). In addition, when the blade of the cutting tool 28 is not chipped and the cutting tool 28 is in other abnormal conditions (for example, a condition in which the cutting tool 28 is jammed by chips of the workpiece W at a machining point P4, a condition in which the cutting tool is not mounted on the tool table 20, a condition in which the operations of the X-axis motor 72, the Z-axis motor 63, and the spindle motor 42 of FIG. 2 are unusual, or a condition in which a cutting program stored in the storage portion 220a of FIG. 2 is unusual) as a result of checking by the operator, the operator presses the "CANCEL" button 232. In this case, it can be considered that the control device 22 erroneously determines other abnormal conditions as chipping. In this case, since the determination of the control device 22 is inappropriate, the monitoring range ΔD is not updated. The reason is as follows. When the monitoring range ΔD is not updated in this case, other abnormal conditions are not reflected on the monitoring range ΔD. In this way, according to the tool abnormality determination system 2 of the embodiment, only when the control device 22 erroneously determines the normal condition, the monitoring range can be updated. Therefore, the precision of the monitoring range can be improved.

In addition, a case is assumed in which the lathe 1 is stopped by the jamming of chips of the workpiece W and the chips are already removed when the operator checks the cutting tool 28. In this case, the cutting tool 28 is not chipped. Therefore, the operator cannot directly check the abnormal condition. However, as illustrated in Step 9 of FIG. 3, on the screen 23, a time change (history) of load data immediately before the lathe 1 is stopped is arranged next to the "YES" button 230, the "NO" button 231, and the "CANCEL" button 232. Therefore, based on the load data and the condition of the cutting tool 28, the operator can presume that the jamming of chips of the workpiece W when the lathe 1 is stopped. In this way, according to the tool abnormality determination system 2 of the embodiment, the abnormal condition can be presumed from a graph of load data of the screen 23.

In addition, in the manual update step, the operator can manually update the monitoring range ΔD. Therefore, for example, when the operator visually inspects chipping, and when load data is in the monitoring range ΔD, the operator manually decreases the upper limit threshold value D2. Likewise, the operator can manually increase the lower limit threshold value D1. In this way, according to the tool abnormality determination system 2 of the embodiment, the monitoring range ΔD which tends to be widened in the peak hold step can be manually narrowed.

In addition, on the screen 23, the "YES" button 230 and the "CANCEL" button 232 are arranged. The "YES" button 230 corresponds to the chipping (main abnormality condition) of the cutting tool 28. The "CANCEL" button 232 corresponds to abnormal conditions (sub abnormality condition) other than chipping. The control device 22 stores a button which is pressed in the storage portion 220a. Therefore, data regarding the abnormal condition can be easily collected, and an abnormality factor can be easily classified.

<<Second Embodiment>>

A tool abnormality determination system according to a second embodiment of the present disclosure has different points from the tool abnormality determination system according to the first embodiment, in that the tool abnormality determination method includes a monitoring period setting step and a continuous excess number threshold value setting step. Hereinafter, the different points will be mainly described. For the description, FIGS. 1 and 2 are used.

Figure 9:
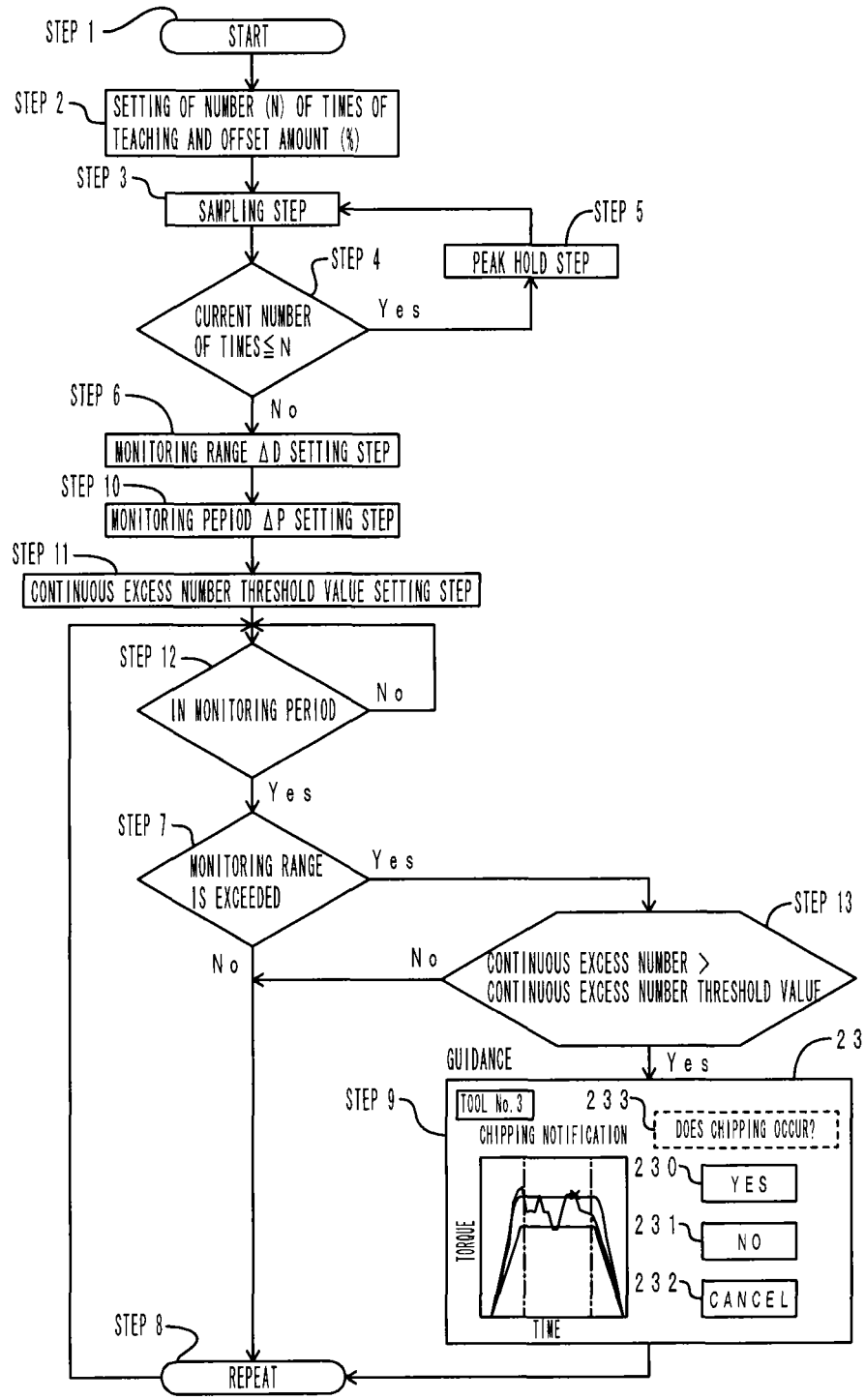
FIG. 9 is a flowchart illustrating a tool abnormality determination method which is performed using a tool abnormality determination system according to a second embodiment of the present disclosure.
Figure 10:
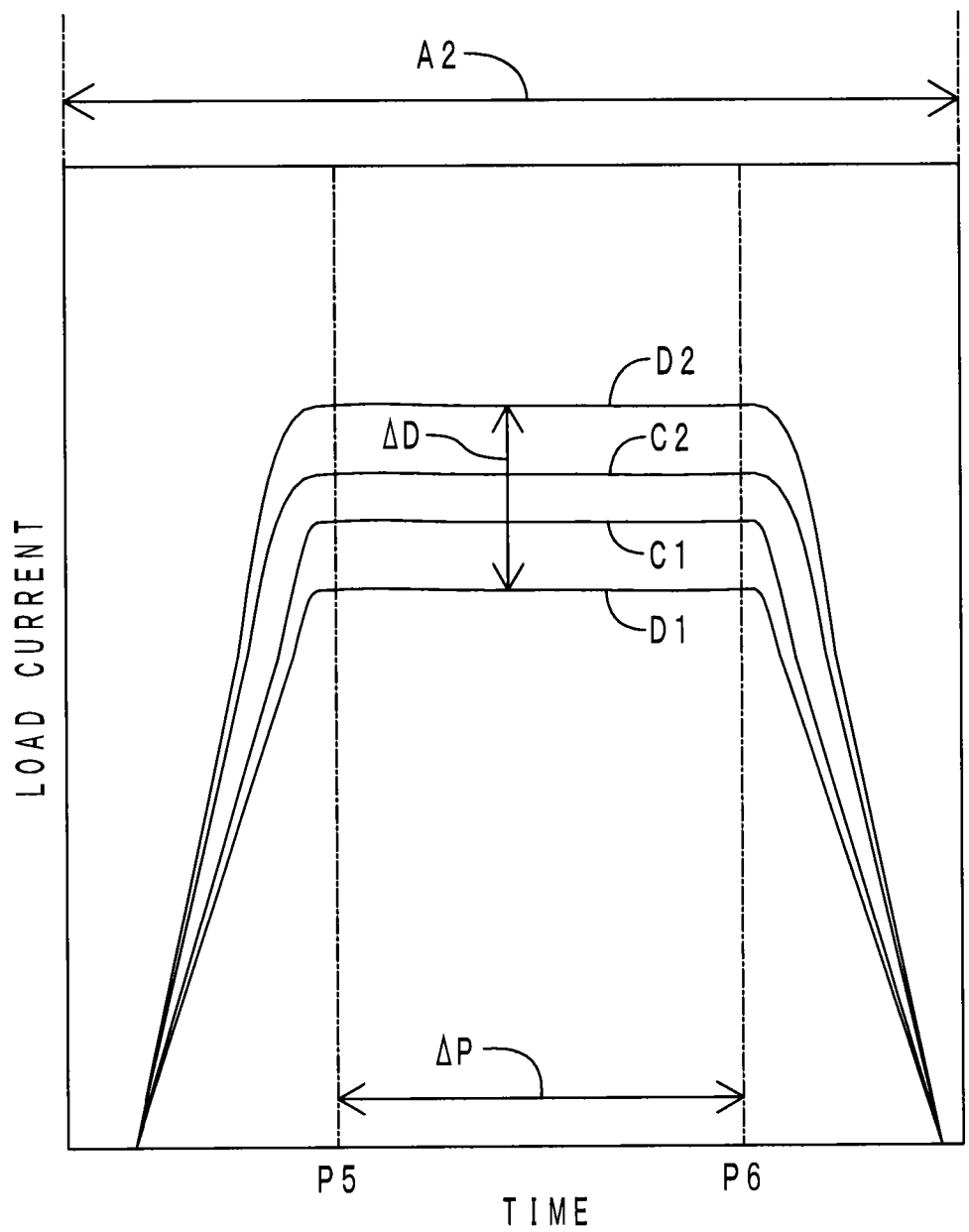
FIG. 10 is a diagram illustrating a monitoring range which is set in a monitoring range setting step of the tool abnormality determination method.

FIG. 9 is a flowchart illustrating a tool abnormality determination method which is performed using the tool abnormality determination system according to the second embodiment. Components corresponding to those of FIG. 3 are represented by the same reference numerals. FIG. 10 is a diagram illustrating a monitoring range which is set in the monitoring range setting step of the tool abnormality determination method. Components corresponding to those of FIG. 6 are represented by the same reference numerals. FIG. 11 is a diagram illustrating load data in the machining step of the tool abnormality determination method. Components corresponding to those of FIG. 7 are represented by the same reference numerals.

As illustrated in FIG. 9, the tool abnormality determination method includes a sampling step, a peak hold step, a monitoring range setting step, a monitoring period setting step, a continuous excess number threshold value setting step, a machining step, an update step, and a manual update step.

In the monitoring range setting step, as illustrated in FIG. 10, the control device 22 sets a monitoring range ΔD (=D2−D1) based on the low-load-side peak hold value C1 and the high-load-side peak hold value C2 obtained in the previous step (Step 6 in FIG. 9). The control device 22 stores the offset amount and the monitoring range ΔD (the lower limit threshold value D1 and the upper limit threshold value D2) in the storage portion 220a.

In the monitoring period setting step, as illustrated in FIG. 10, a distance between load data (start point) P5 and load data (end point) P6 is set to a monitoring period ΔP (Step 10 in FIG. 9).

The monitoring period ΔP is set as follows. That is, the control device 22 calculates a difference G between a maximum value GH and a minimum value GL of ten continuous pieces of load data (load current) among cutting load data in the first sampling step.

In this case, load current values of the spindle motor 42 (specifically, load current values of the spindle motor 42 from which current values necessary for acceleration and deceleration are excluded) are normalized into (−7282 to 7282). A maximum current value (=20 A) of an amplifier (not illustrated) of the motor driving circuits 222 corresponds to "7282".

The control device 22 sets a period "difference ΔG(A)≤ (100/7282)×20 (A)" (specifically, a period in which the inequality relationship is continuously satisfies) as the monitoring period ΔP. In the monitoring period ΔP, a change ratio of a load (=load current/time) is small. Therefore, in the monitoring period ΔP, a load is stable. The control device 22 stores the monitoring period ΔP in the storage portion 220a.

In the continuous excess number threshold value setting step, the operator inputs the continuous excess number threshold value (the threshold value regarding the number of times at which load data (load current) continuously exceeds the monitoring range ΔD in the machining step) to the control device 22 through the screen 23 (Step 12 in FIG. 9). The control device 22 stores the continuous excess number threshold value (in the embodiment, two) in the storage portion 220a.

In the machining process, the control device 22 determines whether or not load data which is detected at a predetermined interval (for example, 30 ms) is included in the monitoring period ΔP (Step 12 in FIG. 9). For example, as in the case of load data P10 to P12 of FIG. 11, when the operation is switched from air-cutting to cutting in the initial stage of the machining step, there is a case where the load current of the spindle motor 42 is rapidly increased. Therefore, the load current exceeds the monitoring range ΔD. However, all the load data P10 to P12 are positioned before the start point P5 of the monitoring period ΔP. That is, all the load data P10 to P12 are not included in the monitoring period ΔP. Therefore, the control device 22 does not compare the load data P10 to P12 to the monitoring range ΔD. That is, the control device 22 does not monitor the load data P10 to P12.

Load data after the load data P12 are included in the monitoring period ΔP (Step 12 in FIG. 9). Therefore, the control device 22 starts to monitor load data (Step 7 in FIG. 9). That is, the control device 22 compares load data to the monitoring range ΔD. When the load data does not exceed the monitoring range ΔD, the monitoring of the load data is continued (Step 8 in FIG. 9).

On the other hand, when the load data exceeds the monitoring range ΔD, the control device 22 counts a continuous excess number (Step 13 in FIG. 9). When the continuous excess number does not exceed the continuous excess threshold value (=two), the monitoring of the load data is continued (Step 8 in FIG. 9).

For example, load data P13 exceeds the monitoring range ΔD, but the next load data P14 does not exceed the monitoring range ΔD. Therefore, the continuous excess number is one. In addition, load data p15 and P16 continuously exceed the monitoring range ΔD, but the next load data P17 does not exceed the monitoring range ΔD. Therefore, the continuous excess number is two. In such a case, the monitoring of the load data is continued (Step 8 in FIG. 9).

On the other hand, when the continuous excess number exceeds the continuous excess threshold value (=two) (Step 13 in FIG. 9), the control device 22 stops the lathe 1 after the machining of the machining part A2 is finished or at the time when the load data exceeds the monitoring range ΔD. In addition, the control device 22 causes guidance to be displayed on the screen 23 (Step 9 in FIG. 9). The subsequent steps are the same as those of the first embodiment.

For example, load data P18 to P20 exceed the monitoring range ΔD three times in a row. That is, the continuous excess number is three (>two) (Step 13 in FIG. 9). In this case, the control device 22 stops the lathe 1 and causes guidance to be displayed on the screen 23 (Step 9 in FIG. 9).

When the machining of the workpiece W progresses and passes the end point P6 of the monitoring period ΔP, the control device 22 finishes the monitoring of the load data (Step 12 in FIG. 9).

Regarding the portions having the same configuration, the tool abnormality determination system according to the second embodiment has the same effects as those of the tool abnormality determination system according to the first embodiment. In addition, according to the tool abnormality determination system according to the second embodiment, as illustrated in Step 12 of FIG. 9 and FIG. 11, in a case where load data exceeds the monitoring period ΔP, the control device 22 does not monitor the load data even if the load data exceeds the monitoring range ΔD. Therefore, a period, such as at an initial period of machining, where load data is likely to be affected by a disturbance factor can be intentionally excluded from the monitoring period ΔP. Accordingly, the occurrence of erroneous determination can be suppressed. As a result, the confusion of the operator can be reduced.

In addition, according to the tool abnormality determination system of the embodiment, as illustrated Step 13 of FIG. 9 and FIG. 11, the control device 22 stops the lathe 1 only when the continuous excess number exceeds the continuous excess number threshold value. In addition, the control device 22 causes guidance to be displayed on the screen 23 (Step 9 in FIG. 9). Therefore, when load data exceeds the monitoring range ΔD due to an abrupt disturbance factor such as dust attached on the workpiece W, the occurrence of erroneous determination can be suppressed. Accordingly, the confusion of the operator can be reduced.

<<Others>>

Hereinabove, the embodiments of the tool abnormality determination system according to the present disclosure have been described. However, embodiments of the present disclosure are not limited to the above-described embodiments. Various modifications and improvements which are conceivable by those skilled in the art can be made.

Figure 12:
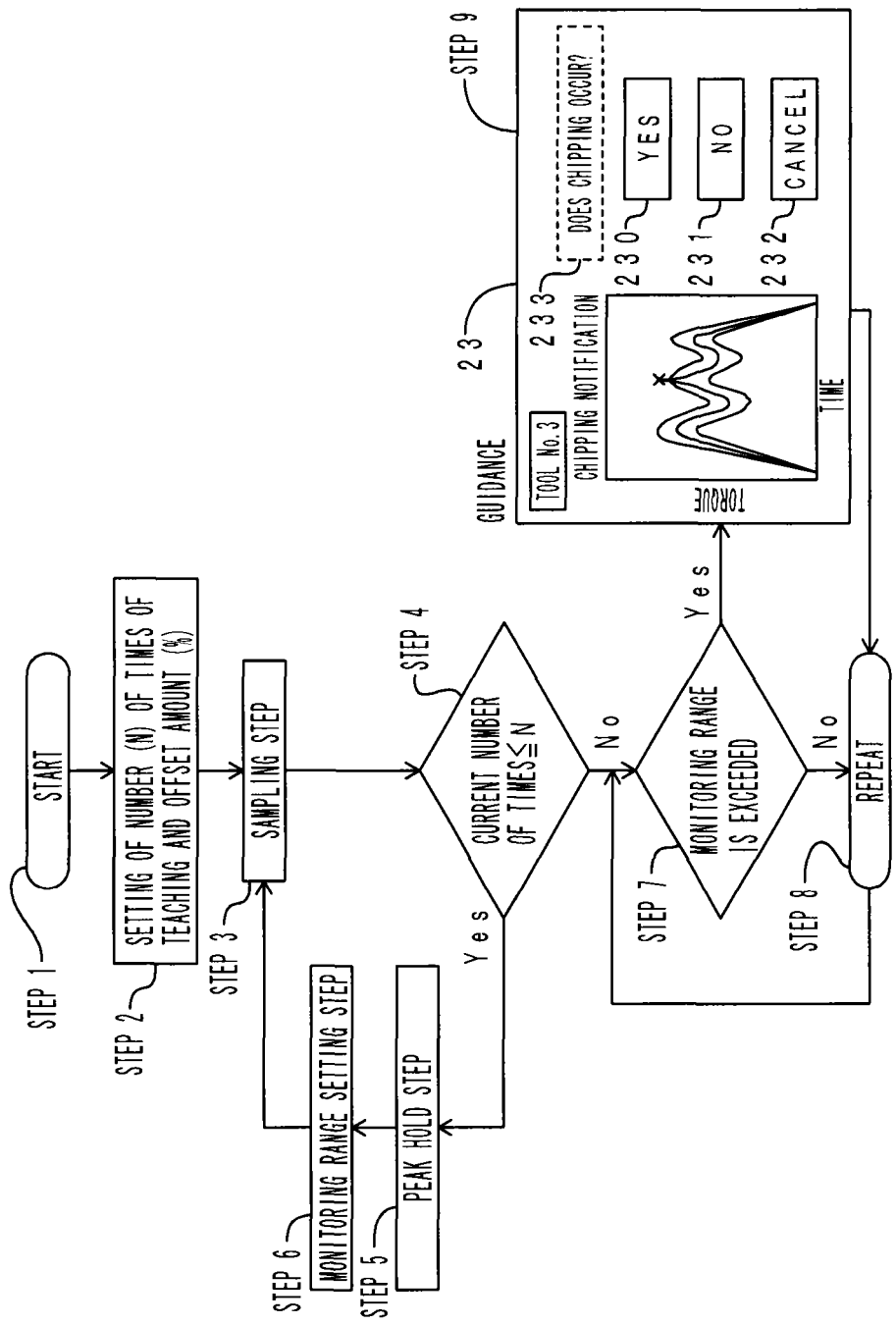
FIG. 12 is a flowchart illustrating a tool abnormality determination method which is performed using a tool abnormality determination system according to another embodiment (first modification example) of the present disclosure.

FIG. 12 is a flowchart illustrating a tool abnormality determination method which is performed using a tool abnormality determination system according to another embodiment (first modification example) of the present disclosure. Components corresponding to those of FIG. 3 are represented by the same reference numerals. As illustrated in FIG. 12, the setting of the monitoring range ΔD (Step 6 in FIG. 12) may be performed in each cycle A. That is, the setting of the monitoring range ΔD may be performed one by one between the peak hold step (Step 5) and the next sampling step (Step 3).

Figure 13:
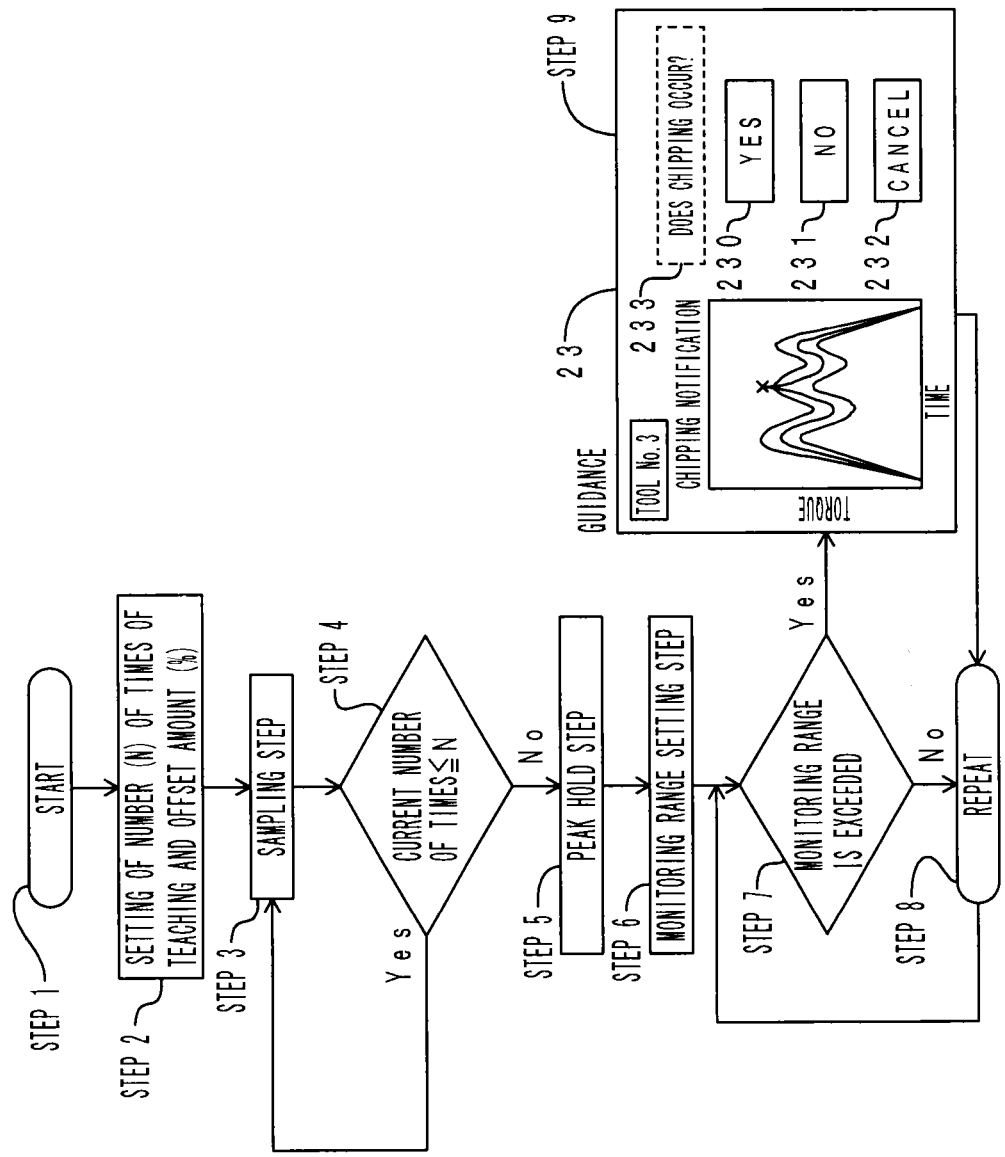
FIG. 13 is a flowchart illustrating a tool abnormality determination method which is performed using a tool abnormality determination system according to still another embodiment (second modification example) of the present disclosure.

FIG. 13 is a flowchart illustrating a tool abnormality determination method which is performed using a tool abnormality determination system according to still another embodiment (second modification example) of the present disclosure. Components corresponding to those of FIG. 3 are represented by the same reference numerals. As illustrated in FIG. 13, the peak hold step (Step 5) may not be performed in each cycle A. After the ten times of cycles A are completed, the peak hold step may be collectively performed.

The number of cycles A in the sampling step, the instruction offset amount h in the peak hold step, and the offset amount H in the monitoring range setting step are not particularly limited. In addition, the number of machining parts A1 and the number of machining parts A2 in the first cycle A (one workpiece W) are not particularly limited. These numbers can be arbitrarily input and updated by the operator.

In addition, in the above-described embodiments, when load data exceeds the monitoring range ΔD (Step 7 in FIG. 3), the control device 22 of FIG. 2 stops the lathe 1 after the machining of the machining part A2 is finished. However, the control device 22 may stop the lathe 1 after the completion of the cycle A. In addition, the lathe 1 may be slowly operated without being stopped. In this way, the response of the control device 22 to the case where load data exceeds the monitoring range ΔD is not particularly limited.

In addition, in the above-described embodiments, as illustrated in FIG. 3, the "YES" button 230, the "NO" button 231, and the "CANCEL" button 232 are arranged on the screen 23. However, only the "YES" button 230 and the "NO" button 231 may be arranged on the screen 23. In this case, the "YES" button 230 also functions as the "CANCEL" button 232. Therefore, the number of buttons on the screen 23 can be reduced.

The type of the load (load data) is not particularly limited. The load only has to have a relationship with at least one of a load of an actuator which moves the tool and a load of an actuator which moves the workpiece. For example, the load may be a torque, a load current, a load voltage, or the like. That is, the torque on the vertical axis of FIGS. 4 to 8 may be a torque or a load current of each of the X-axis motor 72, the Z-axis motor 63, and the spindle motor 42 of FIG. 2. In addition, the load may be a total torque or a total load current of all the motors. In addition, the load may be a total torque or a total load current of two motors among all the motors. In addition, "the load current" on the vertical axis of FIGS. 10 and 11 may be a torque or a load current of each of the X-axis motor 72, the Z-axis motor 63, and the spindle motor 42 of FIG. 2. In addition, the load current may be a total torque or a total load current of all the motors. In addition, the load current may be a total torque or a total load current of two motors among all the motors.

In the tool abnormality determination method which is performed using the tool abnormality determination system according to the second embodiment, the cutting load data of the sampling step (Step 3 in FIG. 9) which is used for setting the monitoring period (Step 10 in FIG. 9) is not particularly limited. Any of cutting load data of the first to tenth cycles may be used. In addition, plural pieces of cutting load data may be synthesized to be used.

In addition, the tool abnormality determination system according to the present disclosure can be used for determining abnormality of a tool of a milling machine or a drill of a drilling machine.

The invention claimed is:

1. A tool abnormality determination system which monitors a tool that machines a workpiece comprising:
a controller configured to
determine a monitoring range,
store the monitoring range, and
compare the monitoring range to a load of the tool during machining; and
an interface that notifies, when the load of the tool exceeds the monitoring range, an operator of a question regarding whether or not the tool is in an abnormal condition other than abrasion,
wherein the load of the tool is at least one of a load of a first actuator which moves the tool and a load of a second actuator which moves the workpiece,
wherein one machining operation on the single workpiece is set to one cycle, and the controller is configured to determine the monitoring range by:
a sampling step of sampling load data regarding the load of the workpiece of the cycle in a state where the interface does not notify the operator of the question;
a peak hold step of acquiring a low-load-side peak hold value and a high-load-side peak hold value based on the sampled load data; and
a monitoring range setting step of setting a lower limit threshold value, which is obtained by correcting the low-load-side peak hold value downward using an offset amount, and an upper limit threshold value, which is obtained by correcting the high-load-side peak hold value upward using the offset amount, and setting a distance between the lower limit threshold value and the upper limit threshold value to the monitoring range, and
wherein the interface includes an abnormality button for an input indicating that the tool is in the abnormal condition and a normality button for an input indicating that the tool is not in the abnormal condition,
the controller being responsive to operation of the abnormality button in response to the question so as not to update the monitoring range, and
the controller being responsive to operation of the normality button in response to the question to update the monitoring range.

2. The tool abnormality determination system according to claim 1,
wherein the abnormal condition is at least one of the chipping of the tool, the non-mounting of the tool, and the jamming of chips of the workpiece.

3. The tool abnormality determination system according to claim 1,
wherein the sampling step, the peak hold step, and the monitoring range setting step can be repeatedly executed in this order N times, N being a natural number of 2 or more.

4. The tool abnormality determination system according to claim 1,
wherein after the sampling step and the peak hold step are repeated in this order N times, N being a natural number of 2 or more, the monitoring range setting step can be executed.

5. The tool abnormality determination system according to claim 1,
wherein after the sampling step is repeated N times, N being a natural number of 2 or more, the peak hold step and the monitoring range setting step can be executed.

6. The tool abnormality determination system according to claim 1,
wherein the offset amount is a value relative to the distance between the low-load-side peak hold value and the high-load-side peak hold value.

7. The tool abnormality determination system according to claim 1,
wherein the interface includes a cause input portion,
the load data of the first cycle is set to reference data, and
when the load data of the second or subsequent cycle exceeds an instruction lower limit threshold value which is disposed below the reference data or an instruction upper limit threshold value which is disposed above the reference data in the sampling step, a cause for the excess is input to the cause input portion by the operator.

8. The tool abnormality determination system according to claim 1,
wherein the abnormal condition includes a main abnormal condition which is an update target of the monitoring range and a sub abnormal condition which is not an update target of the monitoring range,
the abnormality button includes a main abnormality button for an input indicating that the tool is in the main abnormal condition and a sub abnormality button for an input indicating that the tool is in the sub abnormal condition,
the controller responsive to operation of the main abnormality button or the sub abnormality button in response to the question so as to not update the monitoring range, and
the controller responsive to operation of the normality button in response to the question to update the monitoring range.

9. The tool abnormality determination system according to claim 1,
wherein the controller is configured to execute a monitoring period setting step of setting a monitoring period in which whether or not the load of the tool exceeds the monitoring range is monitored.

10. The tool abnormality determination system according to claim 1,
wherein the controller is configured to execute a continuous excess number, which is the number of times at which the load of the tool continuously exceeds the monitoring range, to a continuous excess number threshold value, and
when the continuous excess number exceeds the continuous excess number threshold value, the interface outputs a notification of a question regarding whether or not the tool is in an abnormal condition other than abrasion.

11. The tool abnormality determination system according to claim 1,
wherein the tool is a lathe including a chuck device which holds the workpiece, a table to which the chuck device is fixed and which rotates around an axis, a cutting tool attached to tool table, and a slide portion which moves the tool table and the cutting tool.

* * * * *